US012651139B2

(12) United States Patent
Hopkins et al.

(10) Patent No.: US 12,651,139 B2
(45) Date of Patent: *Jun. 9, 2026

(54) HOUSINGS FOR TRACKING DEVICES

(71) Applicant: Elevation Lab, Inc., Portland, OR (US)

(72) Inventors: Casey Hopkins, Portland, OR (US);
Jacob Hull, Portland, OR (US)

(73) Assignee: Elevation Lab, Inc., Portland, OR (US)

( * ) Notice: Subject to any disclaimer, the term of this
patent is extended or adjusted under 35
U.S.C. 154(b) by 0 days.

This patent is subject to a terminal disclaimer.

(21) Appl. No.: 19/284,306

(22) Filed: Jul. 29, 2025

(65) Prior Publication Data

US 2025/0356158 A1     Nov. 20, 2025

Related U.S. Application Data

(63) Continuation-in-part of application No. 18/817,454,
filed on Aug. 28, 2024, now Pat. No. 12,406,166,
which is a continuation of application No.
18/651,322, filed on Apr. 30, 2024, now Pat. No.
12,106,167.

(51) Int. Cl.
*G06K 19/077* (2006.01)

(52) U.S. Cl.
CPC .............................. *G06K 19/0772* (2013.01)

(58) Field of Classification Search
CPC .... G06K 19/0723; G06K 19/00; G06K 19/04;
G06K 19/07; G06K 19/07772
USPC .......................................... 235/492, 487, 375
See application file for complete search history.

(56) References Cited

U.S. PATENT DOCUMENTS

| | | | | |
|---|---|---|---|---|
| 2013/0181835 A1* | 7/2013 | Hisada | ............... | G08B 21/0288 |
| | | | | 340/539.32 |
| 2013/0265697 A1* | 10/2013 | Taylor | .................. | H05K 5/0095 |
| | | | | 361/679.01 |
| 2014/0266610 A1* | 9/2014 | Xi | ...................... | G06K 19/0772 |
| | | | | 29/601 |
| 2015/0356393 A1* | 12/2015 | Daoura | .................. | G06Q 10/10 |
| | | | | 340/8.1 |
| 2018/0302753 A1 | 10/2018 | Langton | | |
| 2020/0221258 A1* | 7/2020 | Cromer | .................. | H05K 1/189 |
| 2022/0051182 A1 | 2/2022 | Fox et al. | | |
| 2022/0140431 A1 | 5/2022 | Moon | | |
| 2022/0169172 A1* | 6/2022 | Yang | ...................... | B60Q 1/525 |

FOREIGN PATENT DOCUMENTS

| | | | | | |
|---|---|---|---|---|---|
| GB | 2458322 A | * | 9/2009 | ............. | G01S 19/35 |
| GB | 2552177 A | * | 1/2018 | .......... | H01M 50/216 |

OTHER PUBLICATIONS

European Patent Office, Extended European Search Report in
related application EP25151759, Jun. 4, 2025.

* cited by examiner

*Primary Examiner* — Edwyn Labaze
(74) *Attorney, Agent, or Firm* — Kolitch Romano
Dascenzo Gates LLP

(57) ABSTRACT

Housings for tracking devices comprise a body and an
electrical network. The body defines a device-receiving
region that is configured to selectively receive and retain the
tracking device in the body, and a housing battery region that
is configured to selectively receive and retain one or more
housing batteries. The electrical network is operatively
positioned within the body and is configured to electrically
couple the one or more housing batteries with the tracking
device.

21 Claims, 18 Drawing Sheets

HOUSINGS FOR TRACKING DEVICES

RELATED APPLICATION

This application is a continuation-in-part of and claims priority to U.S. patent application Ser. No. 18/817,454, filed on Aug. 28, 2024, which is a continuation of and claims priority to U.S. patent application Ser. No. 18/651,322, filed on Apr. 30, 2024, the disclosures of which are incorporated herein by reference.

FIELD

The present disclosure relates to housings for tracking devices.

BACKGROUND

In recent years, wireless tracking devices have become popular amongst consumers. Consumers often use tracking devices to keep track of sports equipment, electronic equipment, luggage, vehicles, etc. Typically, tracking devices are small and utilize batteries that last for only a limited period of time, such as six to twelve months or so. However, consumers may wish to track certain objects for longer periods of time without the need to replace the batteries in the tracking devices.

SUMMARY

Housings for tracking devices comprise a body and an electrical network. The body defines a device-receiving region that is configured to selectively receive and retain the tracking device in the body, and a housing battery region that is configured to selectively receive and retain one or more housing batteries. The electrical network is operatively positioned within the body and is configured to electrically couple the one or more housing batteries with the tracking device.

DESCRIPTION

Figure 1:
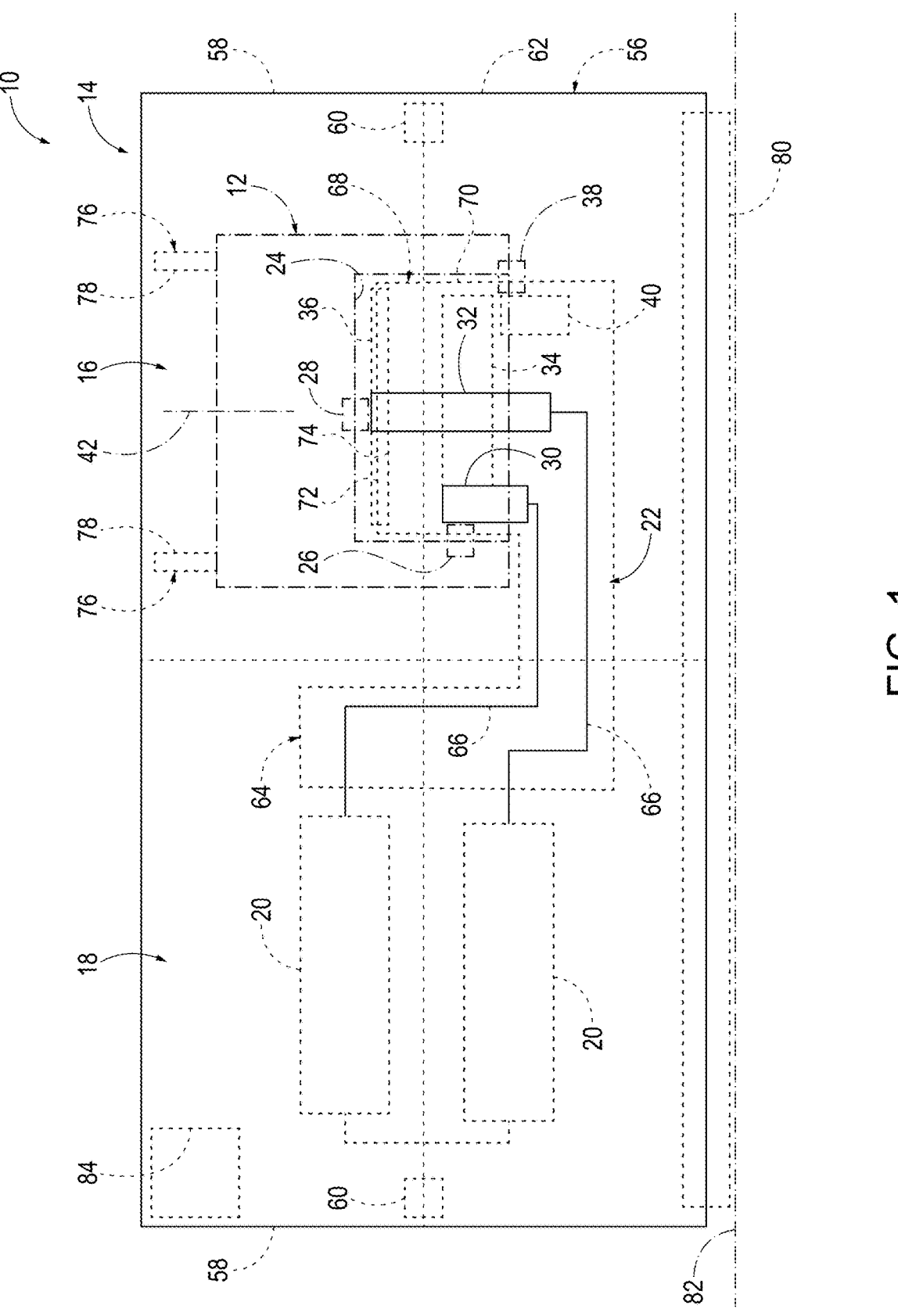
FIG. 1 is a schematic illustration representing housings for tracking devices according to the present disclosure.

Housings 10 for tracking devices 12 and related methods are disclosed herein. Examples of devices 12 include wireless (e.g., WiFi, Bluetooth™, GPS) tracking devices (e.g., Apple™ AirTag™, Tile™, Samsung™ Galaxy™ Smart-Tag™, Chipolo™ One™, CubePro™, Orbit™, and Baseus™ branded tracking devices). Functionally, housings 10 may be used to power tracking devices 12 with one or more batteries that will last longer than the batteries typically (and/or intended to be) used with tracking devices 12. For example, while a tracking device 12 may be designed for use with a small coin battery, such as a 3 Volt (V) coin battery, a housing 10 may permit use of one or more cylindrical batteries, such as two AAA-, AA-, C-, or D-batteries rated at 1.5V in series with each other, and/or with one or more coin batteries. Coin batteries additionally or alternatively may be referred to as coin cell batteries, button batteries, button cell batteries, or watch batteries. Housings 10 may be configured for use with various suitable batteries depending on the particular tracking device 12 with which the housing 10 is intended to be used and/or depending on a desired length of time for the particular tracking device 12 to be powered. As an illustrative example, a 3V coin battery (CR2032) used with an Apple™ AirTag™ device may last about six months, while two 1.5V AA-batteries used with an Apple™ AirTag™ device in a housing 10 may last about ten years or more, two AAA-batteries used with an Apple™ AirTag™ device in a housing 10 may last about five years or more, and a larger 3V coin battery (e.g., CR2477) may last about four years or more. Housings 10 additionally or alternatively may be described as or referred to as cases for tracking devices, battery packs for tracking devices, supplemental battery packs for tracking devices, battery banks for tracking devices, and the like.

FIG. 1 schematically illustrates housings 10 according to the present disclosure. Generally in FIG. 1, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 1, housings 10 comprise at least a body 14 and an electrical network 22 that is operatively positioned within the body 14. The body 14 defines a device-receiving region 16 that is configured to selectively receive and retain a tracking device 12 in the body 14. The body 14 further defines a housing battery region 18 configured to selectively receive and retain one or more housing batteries 20. In some examples, the device-receiving region 16 and the housing battery region 18 may be distinct from each other. In other examples, the two region generally may share the same volume within the body 14. As noted above, depending on the particular tracking device 12 with which a housing 10 is to be used and depending on the desired life of the housing battery(ies) 20, the housing battery(ies) 20 may comprise one or more various types and/or configurations of batteries. Such batteries may be non-rechargeable batteries (e.g., alkaline batteries) or rechargeable batteries (e.g., alkaline, Nickel-Cadmium [NiCd], Nickel-Metal Hydride [MiMH], or Lithium-ion [Li-ion] batteries). Various suitable sizes of housing batteries 20 include (but are not limited to) AAA-, AA-, C-, D-, and coin batteries.

As schematically represented in FIG. 1, the electrical network 22 is configured to electrically couple the housing battery(ies) 20 with the tracking device 12 when the tracking device 12 is operatively received in the device-receiving region 16 and when the housing battery(ies) 20 are operatively received in the housing battery region 18. The electrical network 22 in combination with the housing battery(ies) 20 and the tracking device 12 complete an electrical circuit for operatively powering the tracking device 12.

Figure 2:
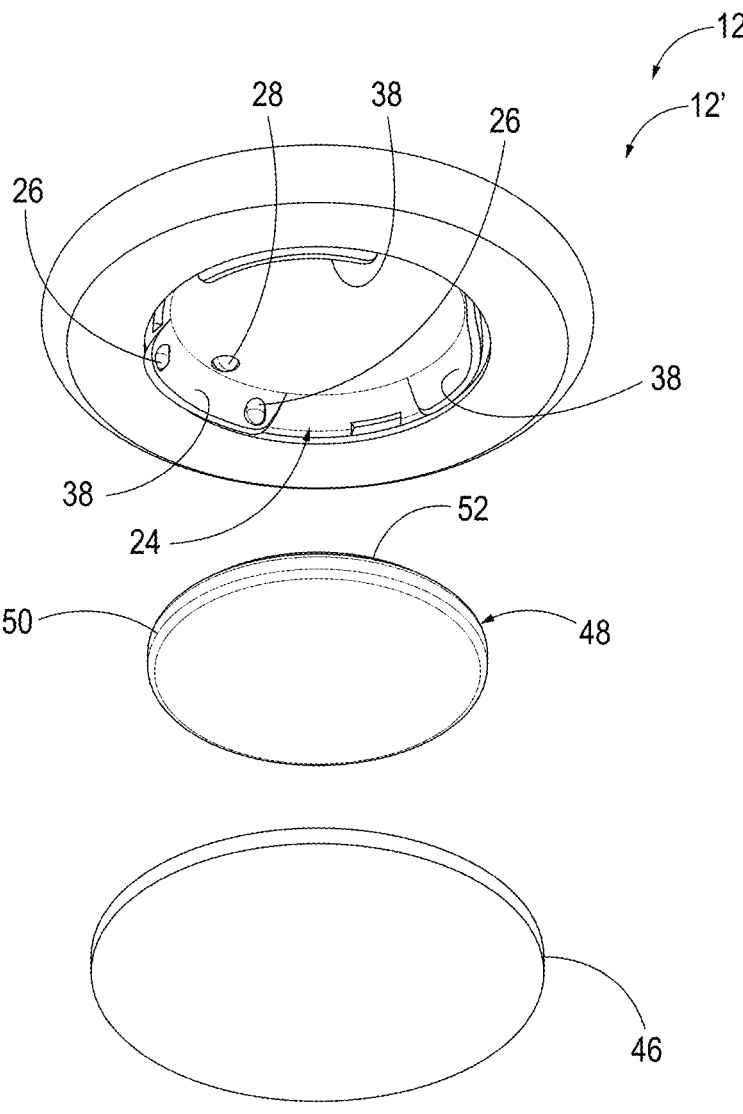
FIG. 2 is a bottom isometric exploded view of an Apple™ AirTag™ device with a coin battery.

With continued reference to the schematic representation of FIG. 1 and also with reference to the example tracking device 12 of FIG. 2 in the form of an Apple™ AirTag™ device 12', in some examples, the tracking device 12 defines a tracking-device battery compartment 24 that is configured to operatively receive one or more device batteries 48, such as a coin battery, as in the example of FIG. 2. In such examples, the tracking device 12 comprises a first tracking-device contact 26 that is positioned to operatively engage a first terminal 50 of the device battery(ies) 48 when the device battery(ies) 48 are operatively received in the tracking-device battery compartment 24. Similarly in such examples, the tracking device 12 comprises a second tracking-device contact 28 that is positioned to operatively engage a second terminal 52 of the device battery(ies) 48 when the device battery(ies) 48 are operatively received in the tracking-device battery compartment 24. In the example of an Apple™ AirTag™ device 12', two first tracking-device contacts 26 provide operative contact with the first terminal 50 of a coin battery. The first tracking-device contact(s) 26 and the second tracking-device contact(s) 28 collectively may be referred to herein as the tracking-device's contacts.

Herein, "Apple™ AirTag™ device" refers to the tracking device illustrated in FIG. 2 and available in the marketplace from Apple Inc. under the AirTag™ trademark as of the date of the present application. "Apple™ AirTag™ device" also refers to future variations thereon that have a similar structure as illustrated in FIG. 2, such that housings 10 as disclosed herein could operatively receive such a tracking device 12 for powering of the tracking device 12.

As schematically represented in FIG. 1, in some examples, the electrical network 22 of the housing 10 comprises a first electrical contact 30 and a second electrical contact 32. The first electrical contact 30 is positioned to operatively engage the first tracking-device contact 26 when the tracking device 12 is operatively received in the device-receiving region 16, and the second electrical contact 32 is positioned to operatively engage the second tracking-device contact 28 when the tracking device 12 is operatively received in the device-receiving region 16. The first electrical contact(s) 30 and the second electrical contact(s) 32 collectively may be referred to herein as the housing's contacts.

In some examples of tracking device 12, such as an Apple™ AirTag™ device 12', the first tracking-device contact(s) 26 and the second tracking-device contact 28 are spring-biased toward, or into, the tracking-device battery compartment 24. Such contacts additionally or alternatively may be referred to as, or as comprising, pogos or pogo pins. In such examples, when a device battery 48 is operatively positioned within the tracking-device battery compartment 24, and a battery cover 46 of the tracking device 12 (see example tracking device 12' of FIG. 2) is operatively installed, the device battery 48 engages and urges the pogo pins against their spring biases.

With continued reference to FIG. 1, some tracking devices 12 may be described as having a central axis 42. In some examples of housings 10, the housing 10 is configured to operatively receive the tracking device 12 in any radial orientation of the tracking device 12 about the central axis 42, and to have the first electrical contact 30 operatively engage the first tracking-device contact 26 and the second electrical contact 32 operatively engage the second tracking-device contact 28 when the tracking device 12 is operatively received in the device-receiving volume 16. Accordingly, in such examples of housings 10, a user need not worry about aligning the tracking device 12 in a particular radial orientation about the central axis 42, as any radial orientation will result in operative engagement of the tracking device's contacts with the housing's contacts.

In some examples, the second electrical contact 32 comprises a disc-shaped body 36 (i.e., a generally cylindrical shape with its radius greater than its thickness). As a result, the disc-shaped body 36 can make operative contact with a corresponding second tracking-device contact 28 regardless of the radial orientation of the tracking device 12, and thus regardless of where the second tracking-device contact 28 is positioned within the tracking-device battery compartment 24 for operative contact at any position on the disc-shaped body 36.

In some examples, the first electrical contact 30 comprises a ring-shaped body 34, that is a generally circular body that extends greater than 180-degrees, greater than 270-degrees, greater than 305-degrees, or even a full 360-degrees about a central axis. As a result, the ring-shaped body 34 can make operative contact with a corresponding first tracking-device contact 26 regardless of the radial orientation of the tracking device 12, and thus regardless of where the first tracking-device contact 26 is positioned within the tracking-device battery compartment 24 for operative contact at any position on the ring-shaped body 34.

In some such examples, the ring-shaped body 34 and the disc-shaped body 36 are coaxial with each other. In particular, the disc-shaped body 36 and the ring-shaped body 34 may generally correspond to the shape and/or size of the terminals of a coin battery configured for use with a particular tracking device 12 (e.g., coin battery 48 of FIG. 2). In some such examples, the ring-shaped body 34 and the disc-shaped body 36 also are coaxial with the central axis 42 of the tracking device 12 when the tracking device 12 is operatively received in the device-receiving region 16.

With continued reference to the schematic representation of FIG. 1, but also with reference to the specific example of an Apple™ AirTag™ device 12' of FIG. 2, some tracking devices 12 comprise one or more structural features 38 that at least partially define the tracking-device battery compartment 24 or that extend into the tracking-device battery compartment 24. When a housing 10 is configured for use with such a tracking device 12, some such housings 10 may comprise one or more indexing features 40 that are configured to engage the structural feature(s) 38 of the tracking device 12 for alignment and engagement of the first electrical contact 30 with the first tracking-device contact 26, and for alignment and engagement of the second electrical contact 32 with the second tracking-device contact 28 when the tracking device 12 is operatively received in the device-receiving volume 16. In other words, in contrast to the examples discussed above, in which the housing 10 is configured to operatively receive the tracking device 12 in any radial orientation of the tracking device 12 about the central axis 42, other housings 10 may be configured to operatively mate with a tracking device 12 in only one or more specific orientations dictated by the indexing features 40 to ensure that the tracking device's contacts operatively engage the housing's contacts.

In some such examples, such as the example Apple™ AirTag™ device 12' of FIG. 2, the structural feature(s) 38 are configured to selectively mate with the battery cover 46 of the tracking device 12 that is configured to selectively retain the device battery(ies) 48 within the tracking-device battery compartment 24. That is, the one or more structural features 38 may serve as mating features for the associated battery cover 46, such as in the form of threads, fastener holes, or other fastener structures, friction-fit structures, snap-fit structures, and the like.

In further examples, the device-receiving region 16 of a housing 10 may be configured to operatively mate with the structural feature(s) 38 of a tracking device 12 to ensure operative alignment and engagement between the housing's contacts and the tracking device's contacts. For example, the body 14 of a housing 10 may comprise threads or other structure(s) (e.g., friction-fit structure(s), snap-fit structure(s), etc.) that are configured to mate with corresponding structural feature(s) 38 in the form of threads or other structures (e.g., friction-fit structure(s), snap-fit structure(s), etc.).

With reference back to FIG. 1 and as represented by the dashed lines generally bisecting the solid rectangular schematic representation of the body 14, in some examples of housings 10, the body 14 comprises a base 56 and one or more covers 58 that are operatively coupled to the base 56 to permit placement and removal of the tracking device 12 in and from the device-receiving region 16, and to permit placement and removal of the housing battery(ies) 20 in and from the housing battery region 18. For example, a single cover 58 may provide access to both the device-receiving region 16 and the housing battery region 18. In other examples, separate covers 58 may provide respective access to the device-receiving region 16 and the housing battery region 18. The cover(s) 58 may be removably coupled to the base 56 via any suitable mechanism, such as but not limited to, fasteners (e.g., screws), threads, friction-fit structures, snap-fit structures, hinges, etc.

In some examples and as schematically represented in FIG. 1, housings 10 further comprise one or more gaskets 60 that are operatively positioned to provide a seal or seals between the base 56 and the cover(s) 58 when the cover(s) 58 are operatively coupled to the base 56. Such housings 10 may be described as or configured to be waterproof for operative protection of the housing battery(ies) 20, the tracking device 12, and the electrical network 22.

In some examples, the base 56 comprises a main base 62 and a base insert 64 that is operatively positioned within the body 14. In some examples, the base insert 64 is coupled to the main base 62, either permanently or temporarily, and in other examples, the base insert 64 is configured to be removed from the main base 62. In some examples, the base insert 64 at least partially defines the device-receiving region 16. In some examples, the base insert 64 additionally or alternatively at least partially defines the housing battery region 18. In some such examples, the electrical network 22 comprises wires 66, and the base insert 64 at least partially conceals the wires 66 between the base insert 64 and the main base 62. In some examples, the base insert 64 is electrically non-conductive. In some examples, at least a portion of the electrical network 22, such as one or both of the first electrical contact 30 and/or the second electrical contact 32, extends through the base insert 64. In some examples, the base insert 64 may be operatively coupled to the main base 62 in any suitable manner, such as with fasteners or adhesive, although in other examples, as noted above, the base insert 64 is not coupled to the main base 62.

In some examples of housings 10 configured for use with tracking devices 12 that define a tracking-device battery compartment 24, the base 56 of the housing 10 may comprise a projection 68 that is positioned and configured to operatively extend into the tracking-device battery compartment 24 when the tracking device 12 is operatively received in the device-receiving volume 16. That is, the base 56 may provide structure for operative mating of the base 56 with a tracking device 12, including for the operative engagement of the housing's contacts with the tracking device's contacts. In some such examples, the base insert 64 comprises the projection 68. Accordingly, in such examples, the base insert 64 may provide structure for operative mating of the housing 10 with a tracking device 12 and operative engagement of the housing's contacts with the tracking device's contacts.

In some examples, the projection 68 is generally cylindrical, and thus is configured for mating with a generally cylindrical or otherwise circular tracking-device battery compartment 24, such as in the example of the Apple™ AirTag™ device 12' of FIG. 2.

In some examples, the projection 68 at least partially supports the first electrical contact 30 and the second electrical contact 32. That is, the projection 68 may provide support for operative and continued engagement between the housing's contacts and the tracking device's contacts when the tracking device 12 is operatively mated with the projection 68. In some examples, the projection 68 is electrically non-conductive to avoid the housing's contacts shorting with each other.

As schematically represented in FIG. 1, in some examples, the projection 68 comprises a perimeter wall 70 and an end wall 72. In some such examples, the first electrical contact 30 is at least partially supported by the perimeter wall 70, and the second electrical contact 32 is at least partially supported by the end wall 72. For example, in examples where the first electrical contact 30 comprises a ring-shaped body 34, the perimeter wall 70 of the projection 68 may support the ring-shaped body 34; and in examples where the second electrical contact 32 comprises a disc-shaped body 36, the end wall 72 of the projection 68 may support the disc-shaped body 36. In some such examples, the end wall 72 defines a recess 74, and the second electrical contact 32 (e.g., the disc-shaped body 36 thereof) is positioned at least partially within the recess 74. Accordingly, the projection 68 may provide insulation around an operative portion of the second electrical contact 32 to restrict shorting of the second electrical contact 32 with the first electrical contact 30. In examples where the second electrical contact 32 comprises a disc-shaped body 36, the recess may be circular for operative receipt of the disc-shaped body 36.

In some examples, at least a portion of the electrical network 22 extends through the end wall 72 of the projection. For example, leads of the second electrical contact 32, or leads or wires operatively connecting the second electrical contact 32 to a contact associated with the housing battery(ies) 20, may extend through the end wall 72 of the projection.

In some examples, rather than being supported by the projection 68, the housing's contacts may be described as at least partially defining the projection 68.

In some examples, the device-receiving region 16 is configured to compress the first tracking-device contact 26 and/or the second tracking-device contact 28 when the tracking device 12 is operatively received in the device-receiving region 16. Such a configuration may ensure operative and continuous contact between the housing's contacts and the tracking device's contacts, preventing the tracking device from moving within the device-receiving region 16. In some such examples, when the tracking-device's contacts are spring-biased, the device-receiving region 16 is configured to compress the tracking device's contacts when the tracking device 12 is operatively received in the device-receiving region 16.

In some examples as schematically represented in FIG. 1, the body 14 comprises one or more ribs 76 that are operatively positioned to engage the tracking device 12 when the tracking device 12 is operatively received in the device-receiving region 16. In some such examples, a cover 58 associated with the device-receiving region 16 comprises the rib(s) 76. In some examples, when the tracking device's contacts are spring-biased, the rib(s) 76 are configured to operatively compress the first tracking-device contact 26 and/or the second tracking-device contact 28 (i.e., cause the first tracking-device contact 26 and/or the second tracking-device contact 28 to become compressed) when the rib(s) 76 operatively engage the tracking device 12, when the tracking device 12 is operatively received in the device-receiving region 16. That is, the rib(s) 76 may push against the tracking device 12 to ensure a snug fit of the tracking device 12 within the device-receiving region 16 and to ensure operative contact between the housing's contacts and the tracking device's contacts. In some examples, the rib(s) 76 are positioned to engage only a peripheral region of a surface of the tracking device 12 when the tracking device 12 is operatively received within the device-receiving volume 16. Such a configuration of rib(s) 76 may avoid muffling an internal speaker of the tracking device 12. That is, by only engaging a peripheral region of the tracking device 12, a volume of air is provided directly adjacent to the tracking device 12, permitting sound waves to transfer to the body 14 of the housing 10 and ultimately into the surrounding environment.

In some examples, the rib(s) 76 comprise a circular rib 78 that is positioned to engage only a peripheral region of tracking device 12. In some such examples, the circular rib 78, when present, is coaxial with the ring-shaped body 34 and the disc-shaped body 36 of the housing's contacts, when so configured. Additionally or alternatively, in examples that comprise a projection 68, the circular rib 78 may be coaxial with the projection 68.

As schematically represented in FIG. 1, some housings 10 further comprise a coupler 80 that is configured to operatively attach the housing 10 to an article 82. In FIG. 1, the optional coupler 80 is schematically represented in an overlapping relationship with the body 14, schematically representing that the coupler 80 may be coupled to an outer surface of the body 14, may be positioned inside of the body 14, or may be integral with the body 14. The coupler 80 may take various configurations, including for example, an adhesive, a double-sided tape, a double-sided foam tape, one or more magnets, fasteners, fastener structures (e.g., holes), slots, bars, etc. Additionally or alternatively, as also schematically represented in FIG. 1, the body 14 of some housings 10 define a through hole 84, which may be used to couple a key ring, a carabiner, a strap, webbing, or other similar structure for operatively coupling the housing 10 to an article 82.

While FIG. 1 schematically presents the device-receiving region 16 and the housing battery region 18 as generally lateral with respect to each other (e.g., in relation to the central axis 42), in some examples, the device-receiving region 16 and the housing battery region 18 may be described as being aligned with the central axis 42 of the tracking device 12, when the tracking device 12 is operatively received in the device-receiving region 16. Additionally or alternatively, the device-receiving region 16 and the housing battery region 18 may be described as being vertically stacked, such as along the central axis 42, when the tracking device 12 is operatively received in the device-receiving region 16. In some examples of housings 10 that comprise a base insert 64, the device-receiving region 16 and the housing battery region 18 are vertically stacked on the same side of the base insert 64. In other examples, the device-receiving region 16 and the housing battery region 18 are vertically stacked on opposite sides of the base insert 64.

Additionally, while the body 14 is schematically depicted as a unitary structure, it also is within the scope of the present disclosure that the body 14 may comprise a first body part that defines the device-receiving region 16 and a second body part that defines the housing battery region 18, with the electrical network extending between the first body part and the second body part.

Also within the scope of the present disclosure are methods of powering a tracking device 12. Such methods comprise: powering the tracking device with a battery cover 46 of the tracking device 12 removed and with no device batteries 48 within a tracking-device battery compartment 24 of the tracking device 12; operatively engaging a first electrical contact 30 of a housing 10 with a first tracking-device contact 26 within the tracking-device battery compartment 24 of the tracking device 12; and operatively engaging a second electrical contact 32 of the housing 10 with a second tracking-device contact 28 within the tracking-device battery compartment 24 of the tracking device 12.

Turning now to FIGS. 3-18, non-exclusive examples of housings 10 in the form of housing 100, housing 200, housing 300, housing 400, housing 500, and housing 600 are illustrated. Where appropriate, the reference numerals from the schematic illustration of FIG. 1 are used to designate corresponding parts of housing 100, housing 200, housing 300, housing 400, housing 500, and housing 600; however, the examples of FIGS. 3-18 are non-exclusive and do not limit housings 10 to the illustrated embodiments of housing 100, housing 200, housing 300, housing 400, housing 500, and housing 600. That is, housings 10 are not limited to the specific embodiments of the illustrated housing 100, housing 200, housing 300, housing 400, housing 500, and housing 600, and housings 10 may incorporate any number of the various aspects, configurations, characteristics, properties, etc. of housings 10 that are illustrated and discussed with reference to the schematic representation of FIG. 1 and/or the embodiments of FIGS. 3-18, as well as variations thereof, without requiring the inclusion of all such aspects, configurations, characteristics, properties, etc. For the purpose of brevity, each previously discussed component, part, portion, aspect, region, etc., or variants thereof may not be discussed, illustrated, and/or labeled again with respect to housing 100, housing 200, housing 300, housing 400, housing 500, and housing 600. However, it is within the scope of the present disclosure that the previously discussed features, variants, etc. may be utilized with housing 100, housing 200, housing 300, housing 400, housing 500, and/or housing 600.

Figure 3:
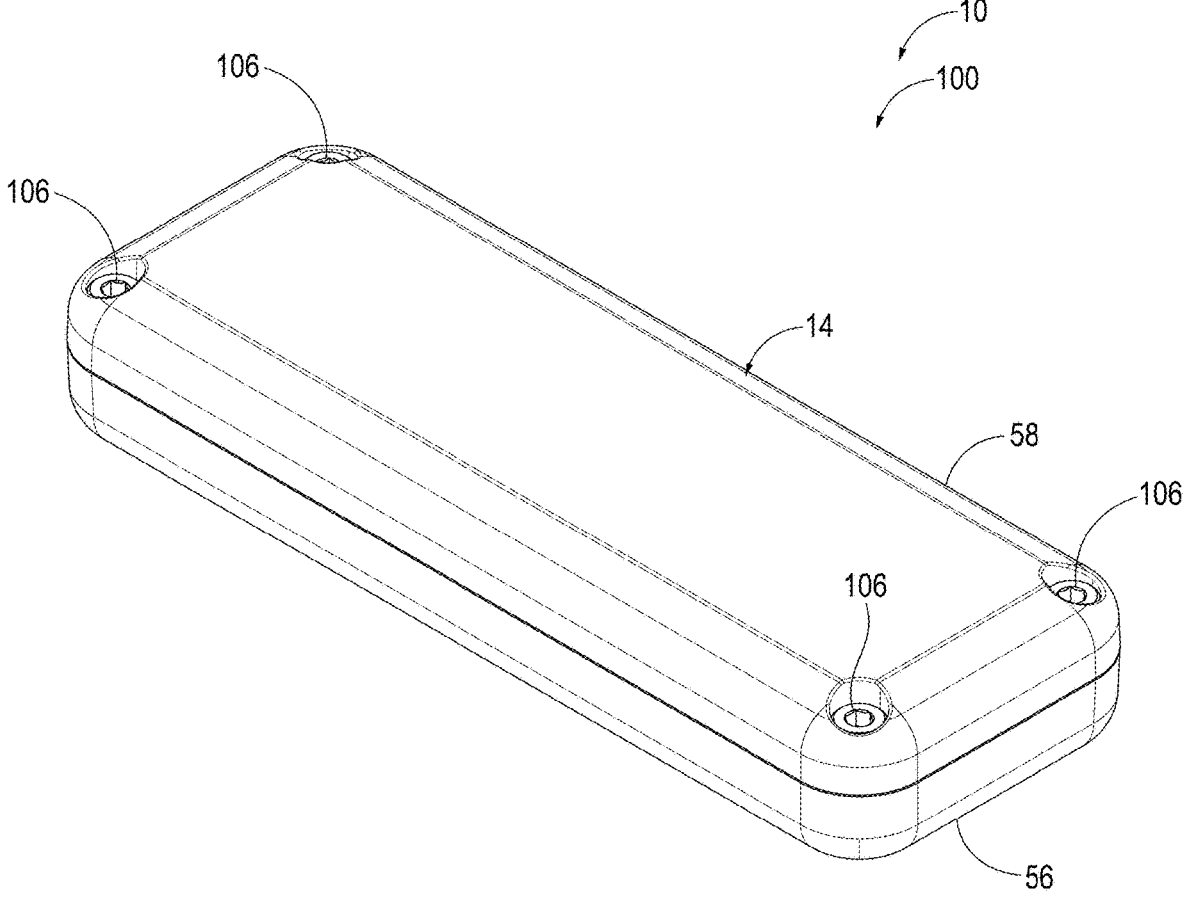
FIG. 3 is a top isometric view of an example housing according to the present disclosure.
Figure 4:
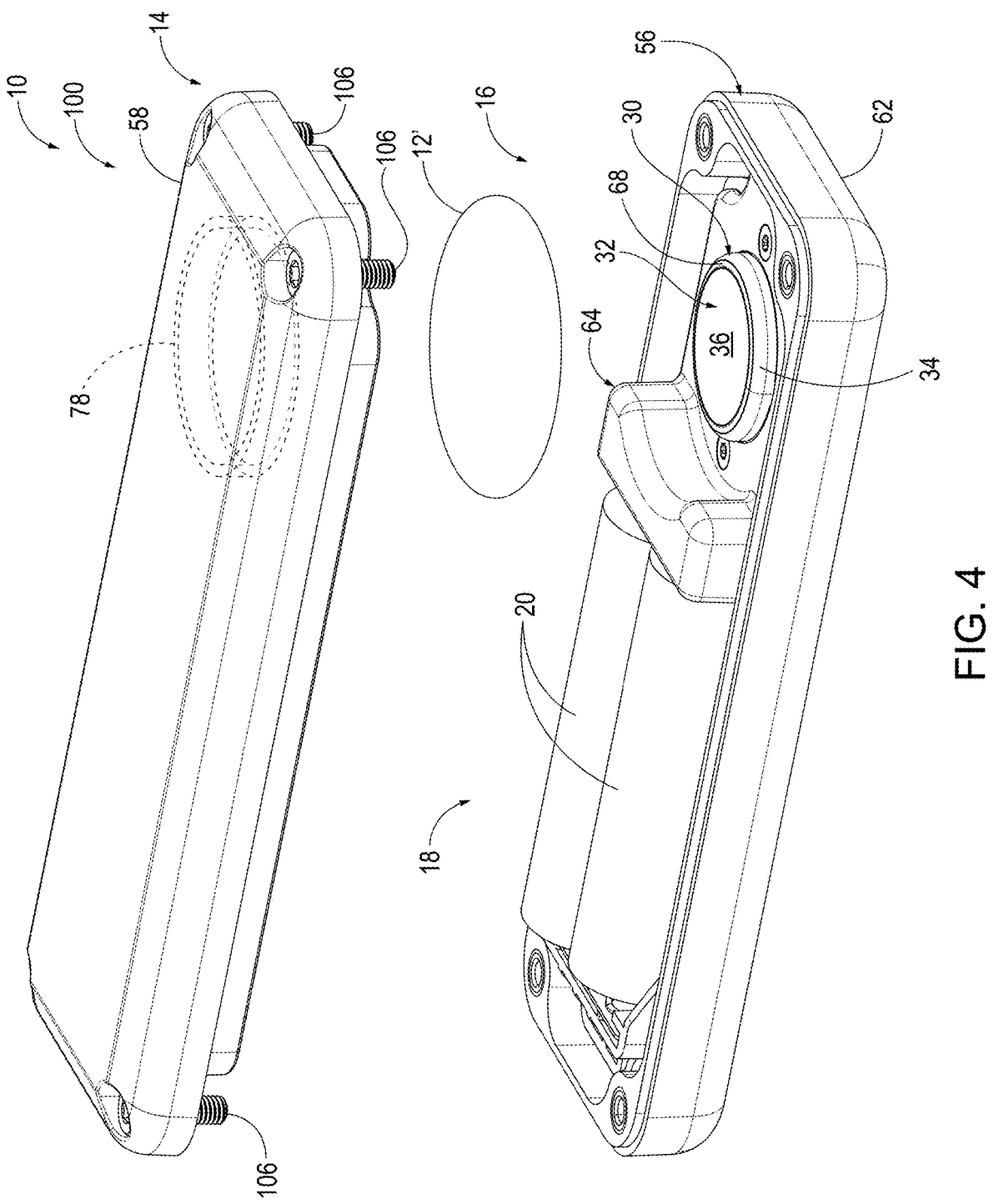
FIG. 4 is a top isometric exploded view of the example housing of FIG. 3, shown with an Apple™ AirTag™ device and with housing batteries installed.
Figure 5:
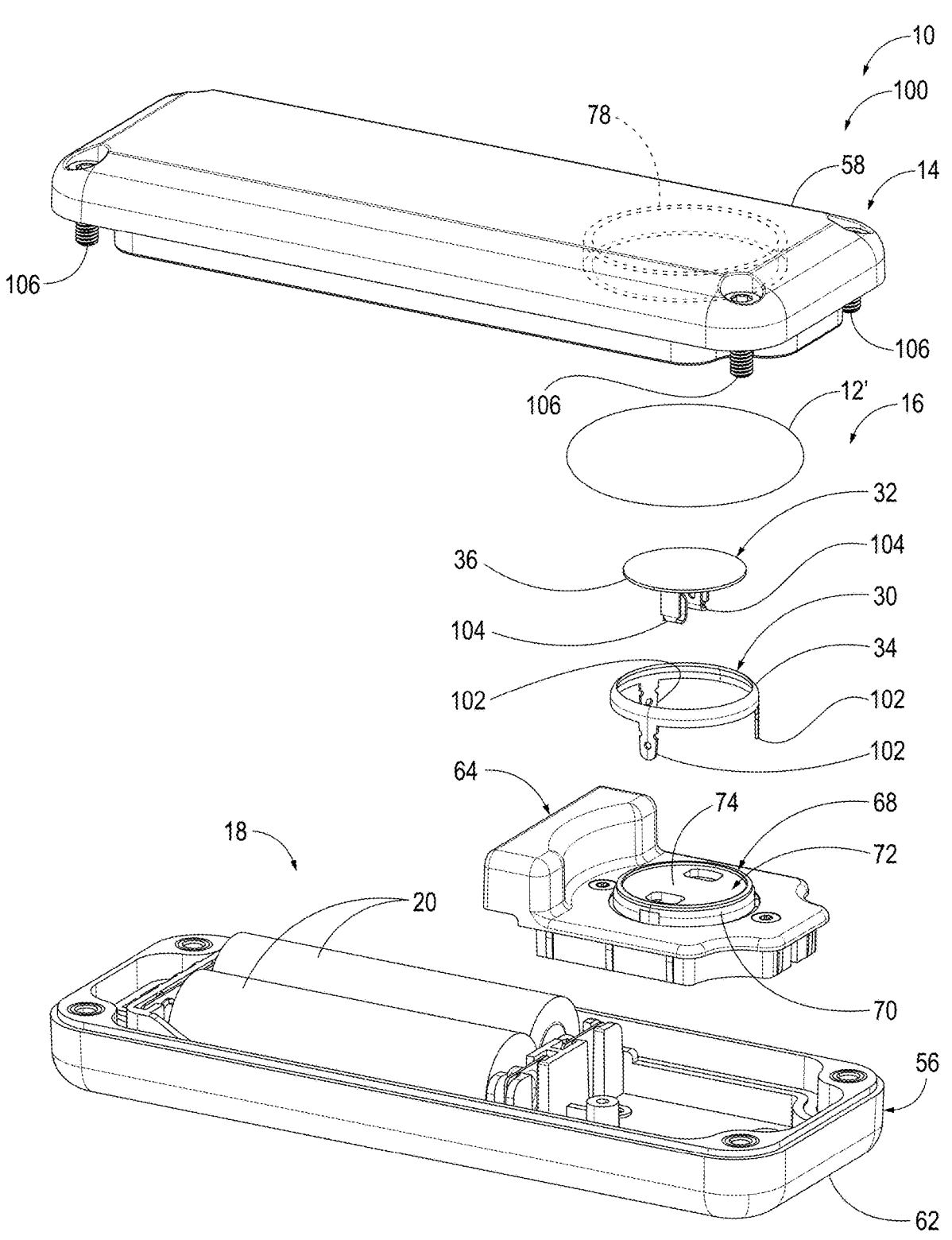
FIG. 5 is a further top isometric exploded view of the example housing of FIG. 3, shown with an Apple™ AirTag™ device and with housing batteries installed.

FIGS. 3-5 illustrate example housing 100. Housing 100 is an example of a housing 10 that is configured to power an Apple™ AirTag™ device 12' utilizing two AA-batteries 20. In particular, housing 100 is configured to receive an Apple™ AirTag™ device 12' with its battery cover 46 removed, and with the Apple™ AirTag™ device 12' in any radial orientation about its central axis. The body 14 of housing 100 comprises a base 56 and a cover 58 that is removably coupled to the base 56 with four screws 106. The base 56 comprises a main base 62 and a base insert 64 coupled to the main base 62. The base insert 64 comprises a generally cylindrical projection 68 that supports the housing's contacts. As perhaps best seen in the exploded view of FIG. 5, the projection 68 of housing 100 comprises a perimeter wall 70 that supports the first electrical contact 30, and an end wall 72 that supports the second electrical contact 32. Moreover, housing 100 is an example of a housing 10 whose first electrical contact 30 comprises a ring-shaped body 34 and whose second electrical contact 32 comprises a disc-shaped body 36. The end wall 72 defines a recess 74, within which the disc-shaped body 36 is seated. The first electrical contact 30 also comprises leads 102 that extend from the ring-shaped body 34, through the base insert 64. At least one of the leads 102 is coupled to a wire 66 (not depicted) for operative connection to the batteries 20. The second electrical contact 32 also comprises leads 104 that extend from the disc-shaped body 36 and through the end wall 72 of the projection 68 of the base insert 64. At least one of the leads 104 is coupled to a wire 66 (not depicted) for operative connection to the batteries 20.

Figure 6:
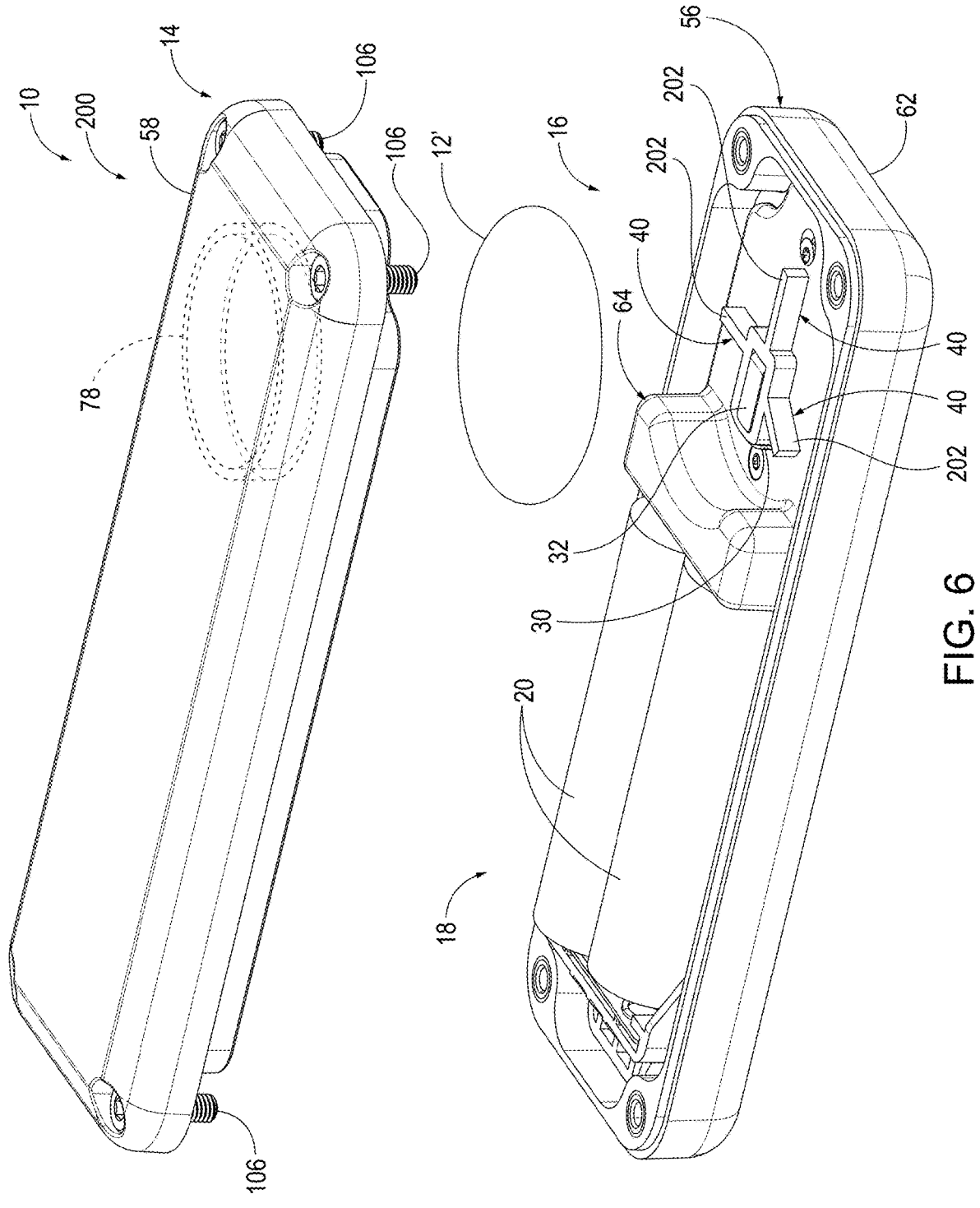
FIG. 6 is a top isometric exploded view of another example housing according to the present disclosure, shown with an Apple™ AirTag™ device and with housing batteries installed.

FIG. 6 illustrates example housing 200. Housing 200 is another example of a housing 10 that is configured to power an Apple™ AirTag™ device 12' utilizing two AA-batteries 20. Like housing 100, the body 14 of housing 200 comprises a base 56 and a cover 58 that is removably coupled to the base 56 with four screws 106, and the base 56 comprises a main base 62 and a base insert 64 that is coupled to the main base 62. Also like housing 100, housing 200 is configured to receive an Apple™ AirTag™ device 12' with its battery cover 46 removed. However, unlike housing 100, housing 200 is not configured to receive an Apple™ AirTag™ device 12' in any radial orientation about its central axis. Rather, housing 200 is an example of a housing 10 that is configured to receive an Apple™ AirTag™ device 12' in a single radial orientation, to ensure that the housing's contacts operatively engage the tracking device's contacts. In particular, as seen in FIG. 6, the base insert 64 of housing 200 comprises three ribs 202 that serve as indexing features 40 for engagement with corresponding structural features within the tracking-device battery compartment 24 of the Apple™ AirTag™ device 12'.

Figure 7:
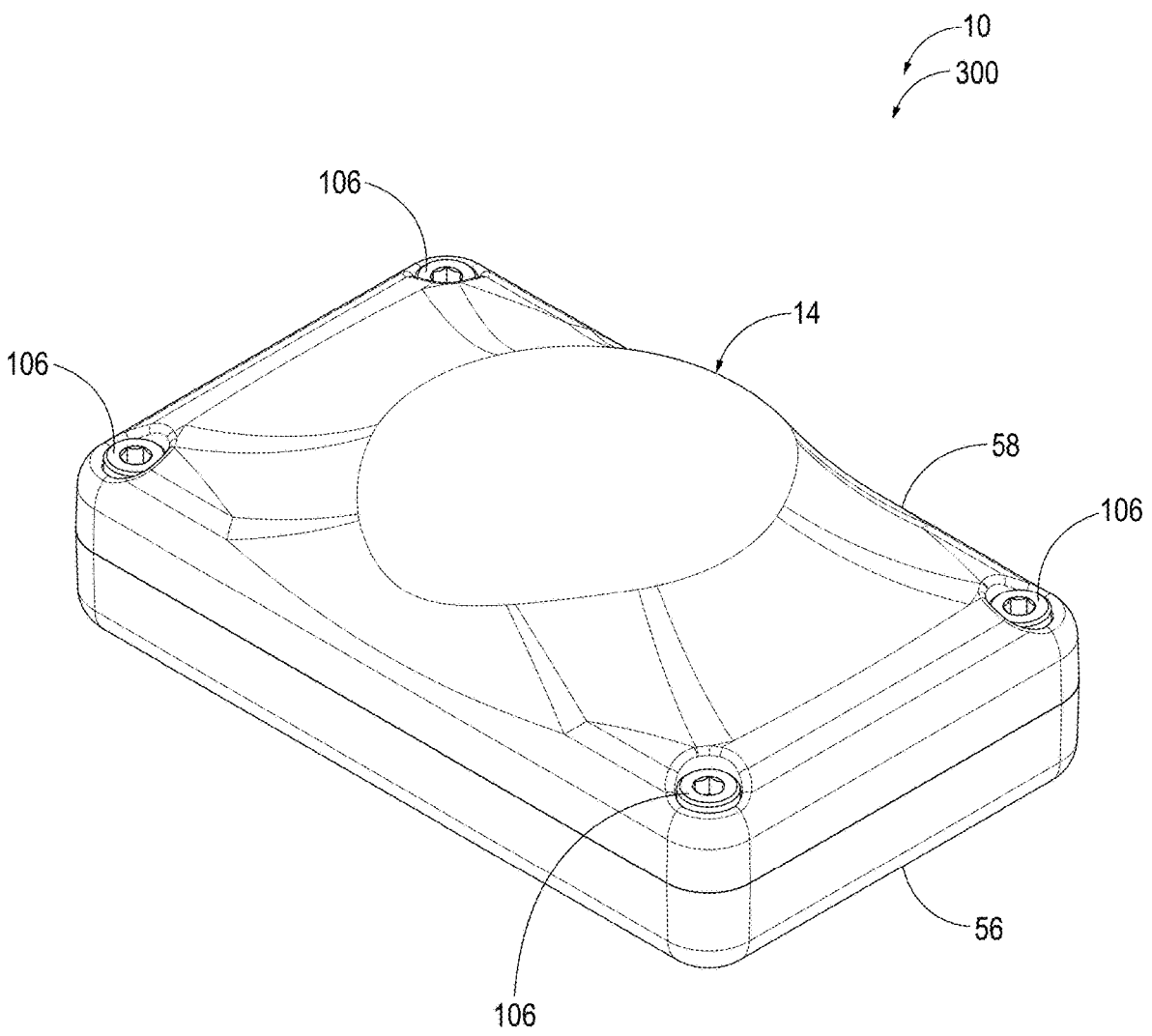
FIG. 7 is a top isometric view of another example housing according to the present disclosure.
Figure 8:
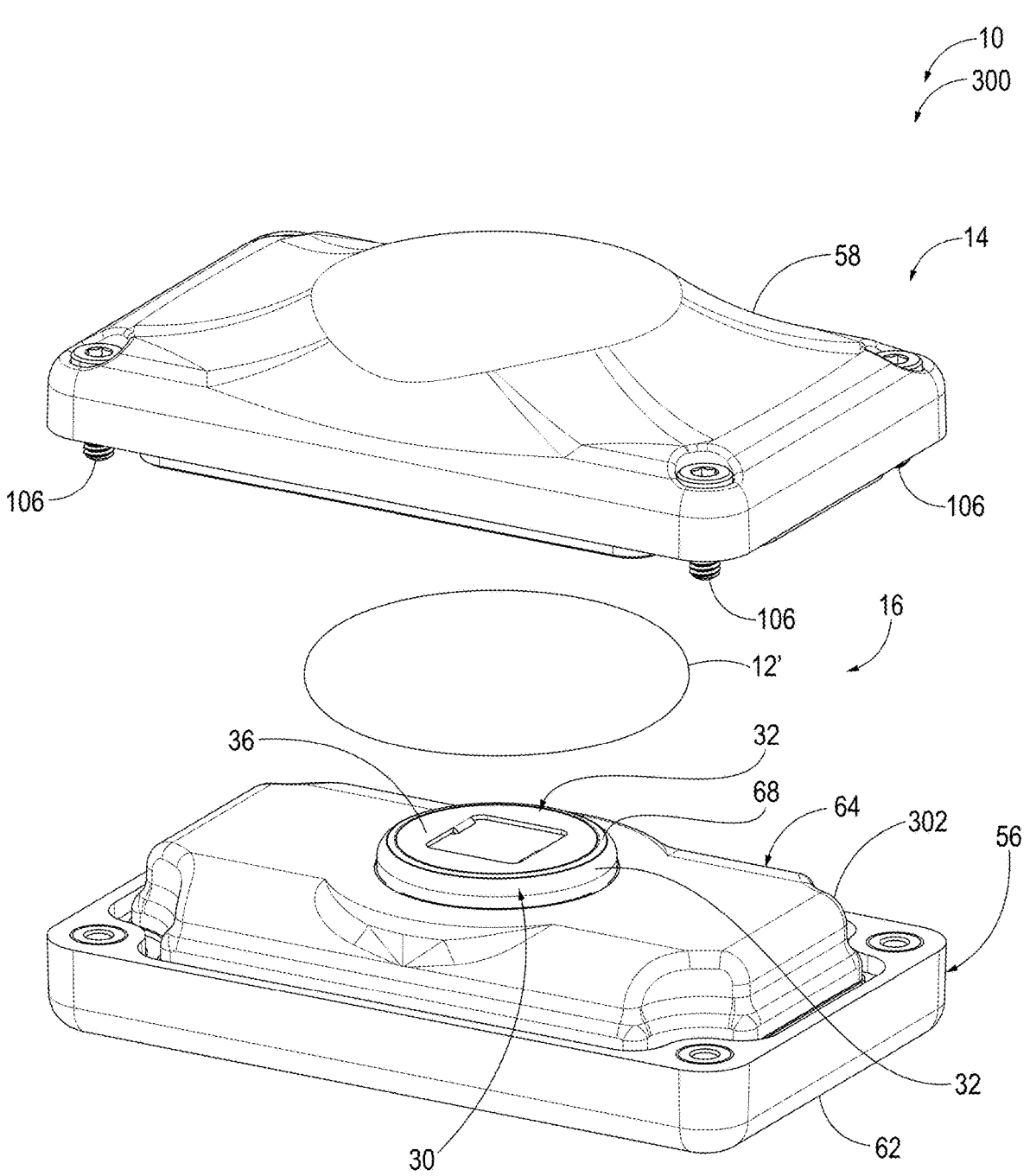
FIG. 8 is a top isometric exploded view of the example housing of FIG. 7, shown with an Apple™ AirTag™ device and with housing batteries installed.
Figure 9:
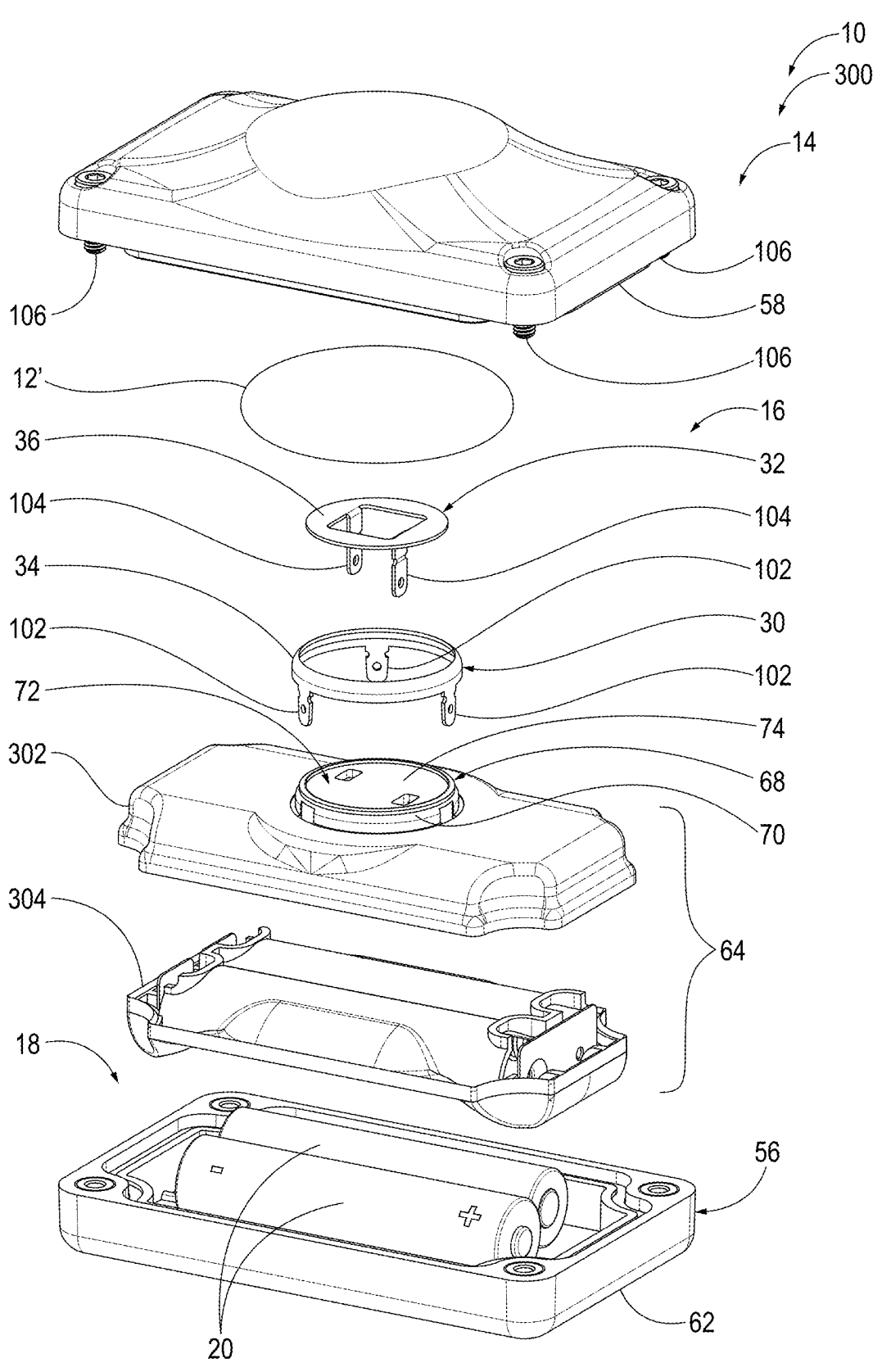
FIG. 9 is a further top isometric exploded view of the example housing of FIG. 7, shown with an Apple™ AirTag™ device and with housing batteries installed.

FIGS. 7-9 illustrate example housing 300. Housing 300 is another example of a housing 10 that is configured to power an Apple™ AirTag™ device 12'; however, rather than utilizing two AA-batteries, housing 300 is configured to utilize two AAA-batteries. The body 14 of housing 300 comprises a base 56, a cover 58 removably coupled to the base 56 with four screws 106, and a base insert 64 that is removable. The device-receiving region 16 and the housing battery region 18 of the housing 300 are vertically stacked on opposite sides of the base insert 64. Like housing 100, the base insert 64 comprises a generally cylindrical projection 68, the first electrical contact 30 comprises a ring-shaped body 34, and the second electrical contact 32 comprises a disc-shaped body 36 seated within a recess 74 in the end wall 72 of the projection 68. Accordingly, like housing 100, housing 300 is an example of a housing 10 that is configured to receive an Apple™ AirTag™ device 12' with its battery cover 46 removed, and with the Apple™ AirTag™ device 12' in any radial orientation about its central axis. Unlike housing 100 and housing 200 however, and as seen in FIG. 9, the base insert 64 comprises a first base-insert portion 302 and a second base-insert portion 304 that are coupled together and conceal the associated wires (not shown) that connect the first electrical contact 30 and the second electrical contact 32 with the corresponding terminals that engage the batteries 20. The base insert 64 is removed from the main base 56 for operative installation of the batteries 20.

Figure 10:
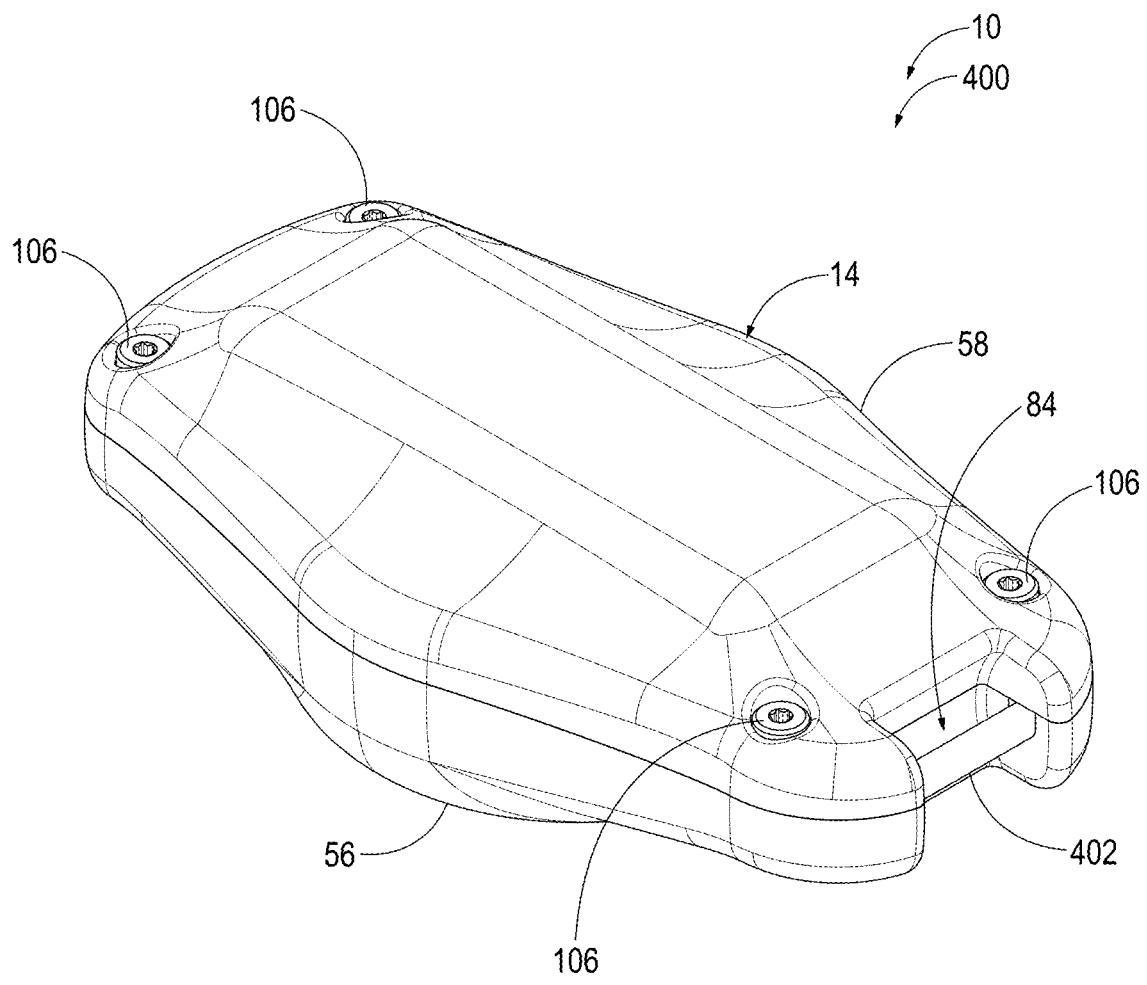
FIG. 10 is a top isometric view of another example housing according to the present disclosure.
Figure 11:
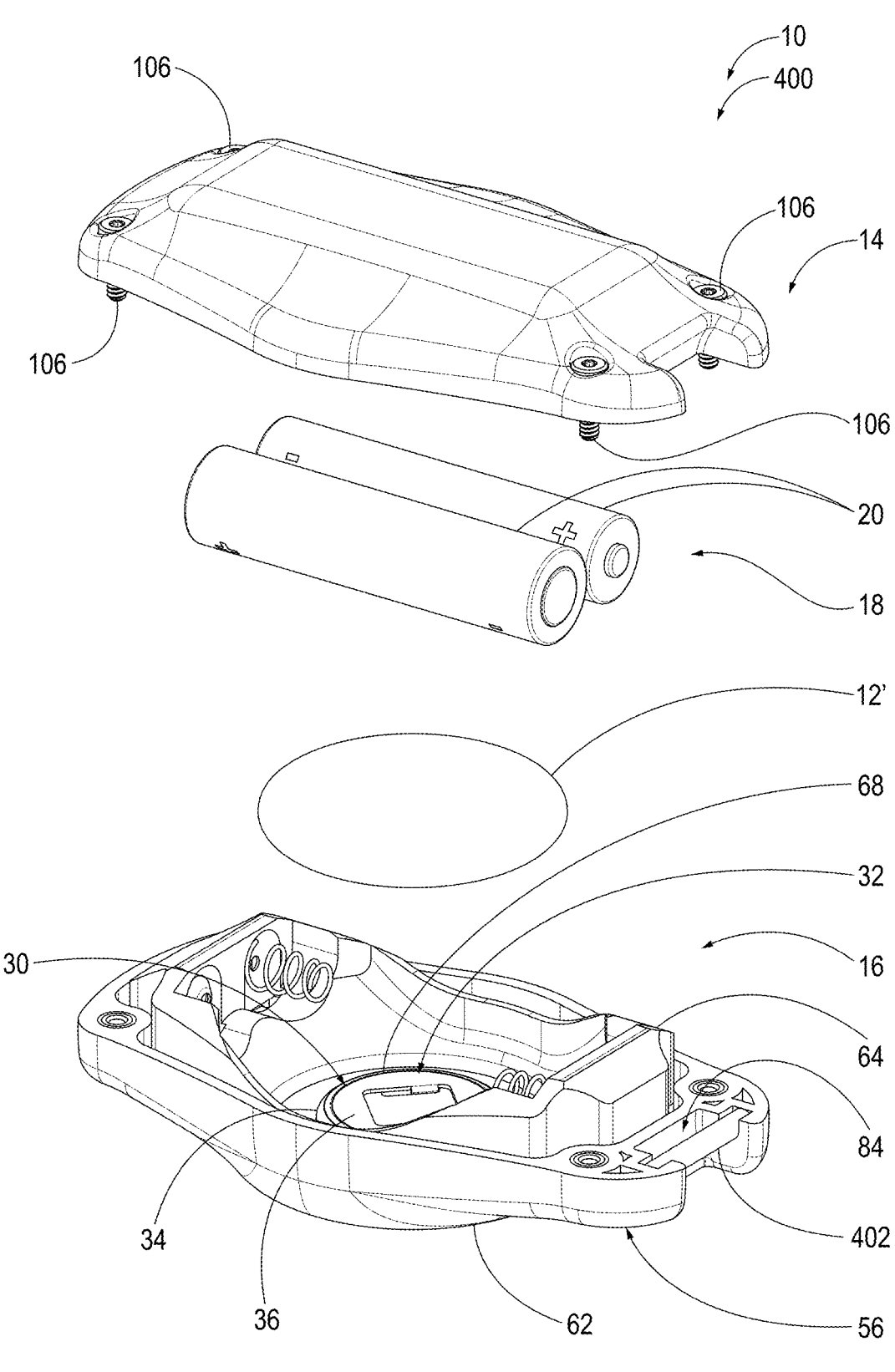
FIG. 11 is a top isometric exploded view of the example housing of FIG. 10, shown with an Apple™ AirTag™ device and with housing batteries installed.
Figure 12:
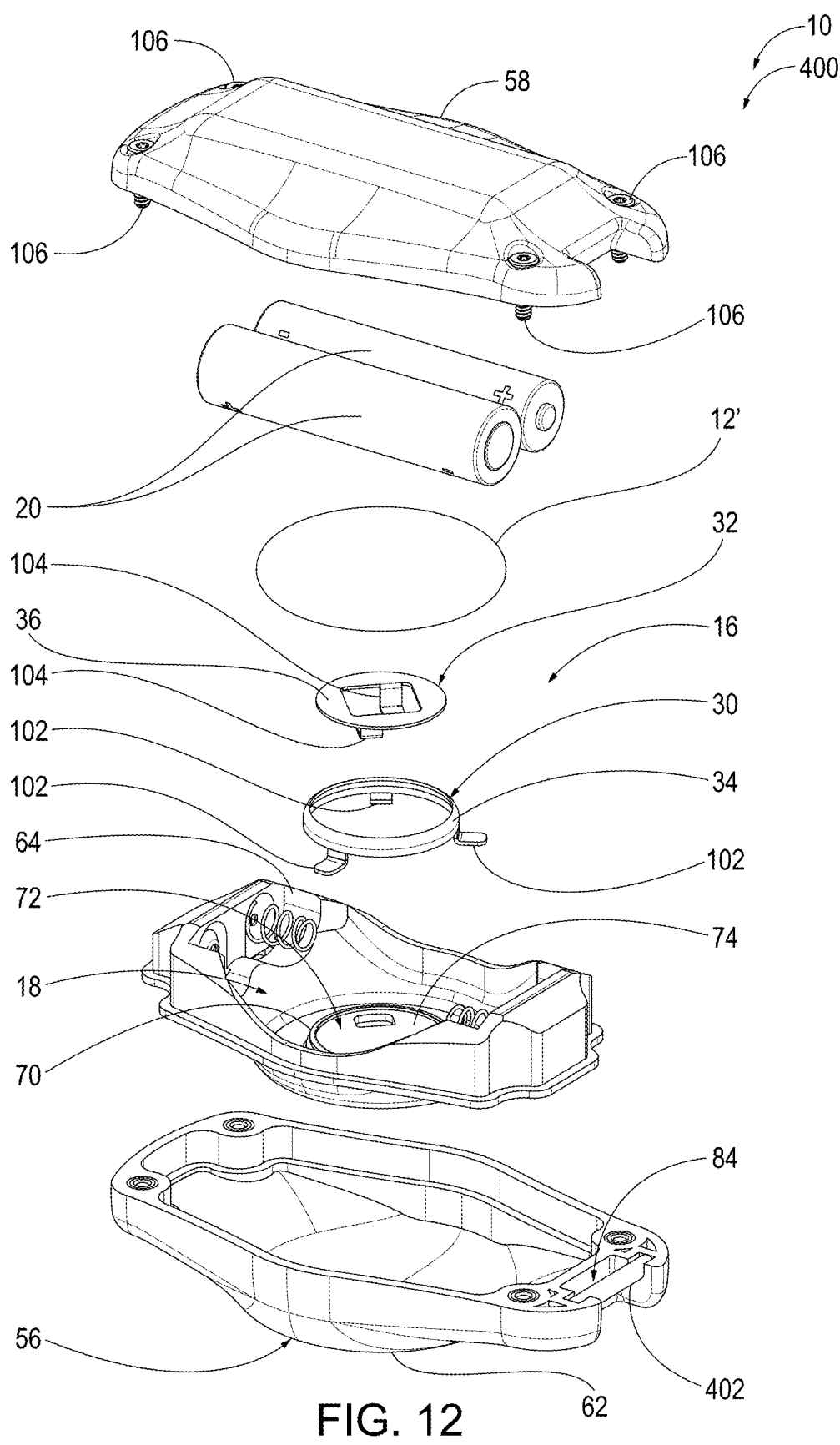
FIG. 12 is a further top isometric exploded view of the example housing of FIG. 10, shown with an Apple™ AirTag™ device and with housing batteries installed.

FIGS. 10-12 illustrate example housing 400. Housing 400 is another example of a housing 10 that is configured to power an Apple™ AirTag™ device 12' utilizing two AAA-batteries. Similar to housing 300, the body 14 of housing 400 comprises a base 56, a cover 58 removably coupled to the base 56 with four screws 106, and a base insert 64 that is removable. Also like housing 300, the device-receiving region 16 and the housing battery region 18 of the housing 400 are vertically stacked. However, unlike housing 300, the device-receiving region 16 and the housing battery region 18 of the housing 400 are vertically stacked on the same side of the base insert 64. In particular, the base insert 64 of housing 400 substantially defines both the device region 16 and the housing battery region 18. Like housings 100 and 300, the base insert 64 of housing 400 comprises a generally cylindrical projection 68, the first electrical contact 30 comprises a ring-shaped body 34, and the second electrical contact 32 comprises a disc-shaped body 36 seated within a recess 74 in the end wall 72 of the projection 68. Accordingly, like housings 100 and 300, housing 400 is an example of a housing 10 that is configured to receive an Apple™ AirTag™ device 12' with its battery cover 46 removed, and with the Apple™ AirTag™ device 12' in any radial orientation about its central axis. Housing 400 is an example of a housing 10 that defines a through hole 84 configured to receive a strap or webbing for operatively coupling the housing 400 to an article. More specifically, the body 14 of housing 400 comprises a bar 402 that is captured between the main base 62 and the cover 58 to define the through hole 84.

Figure 13:
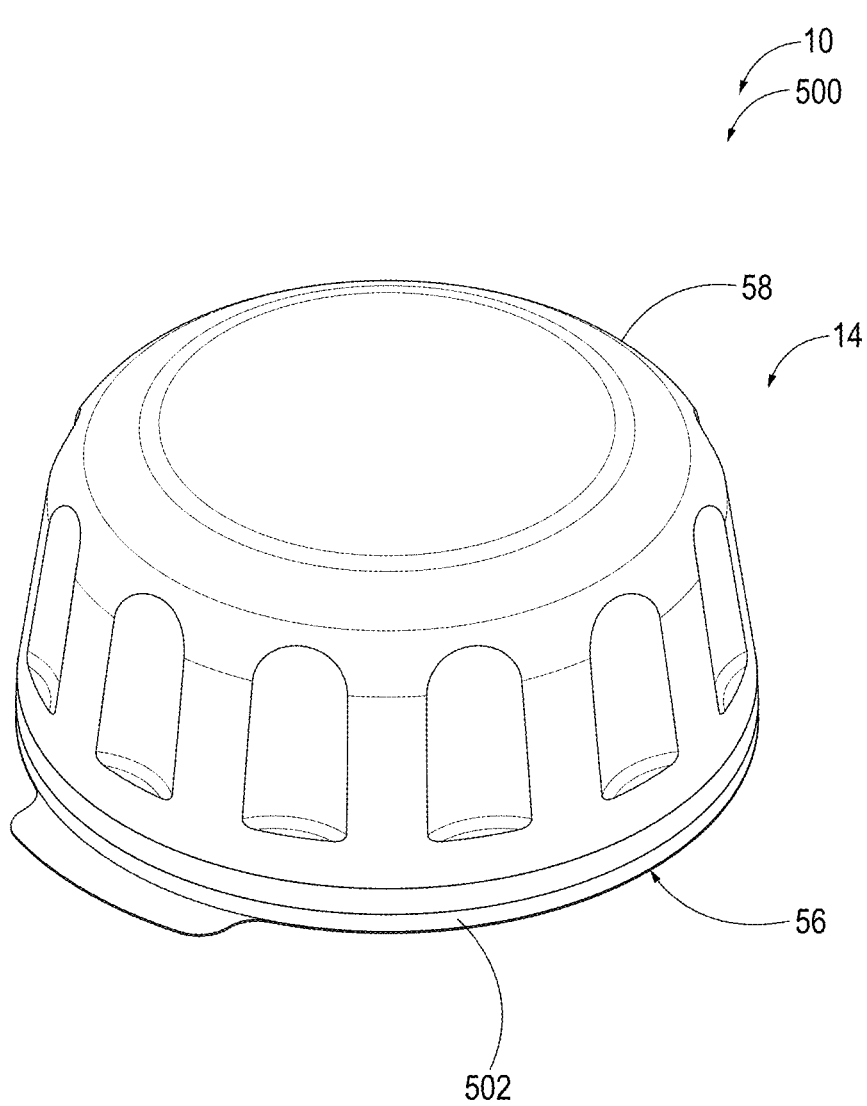
FIG. 13 is a top isometric view of another example housing according to the present disclosure.
Figure 14:
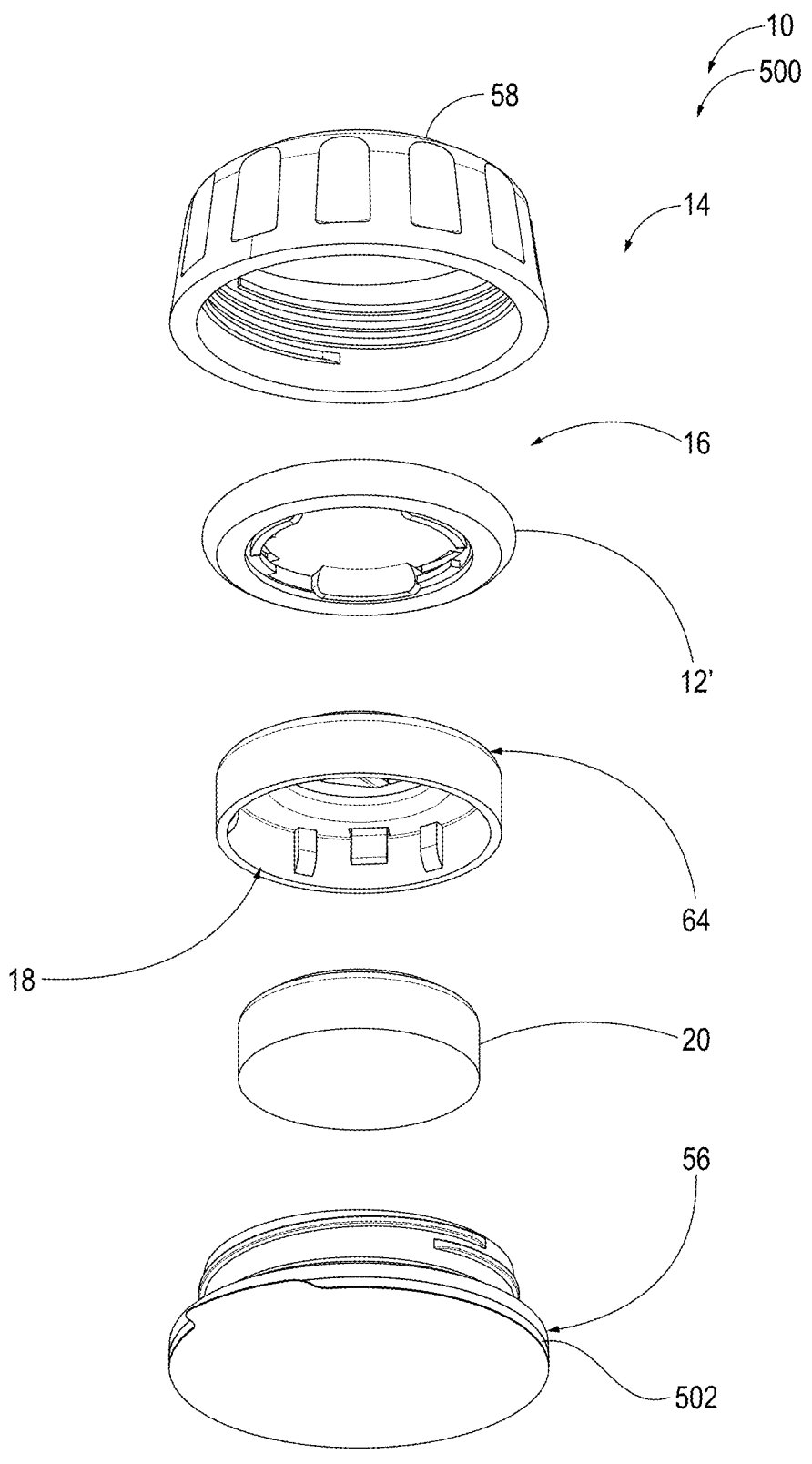
FIG. 14 is a bottom isometric exploded view of the example housing of FIG. 13, shown with an Apple™ AirTag™ device and a housing battery.
Figure 15:
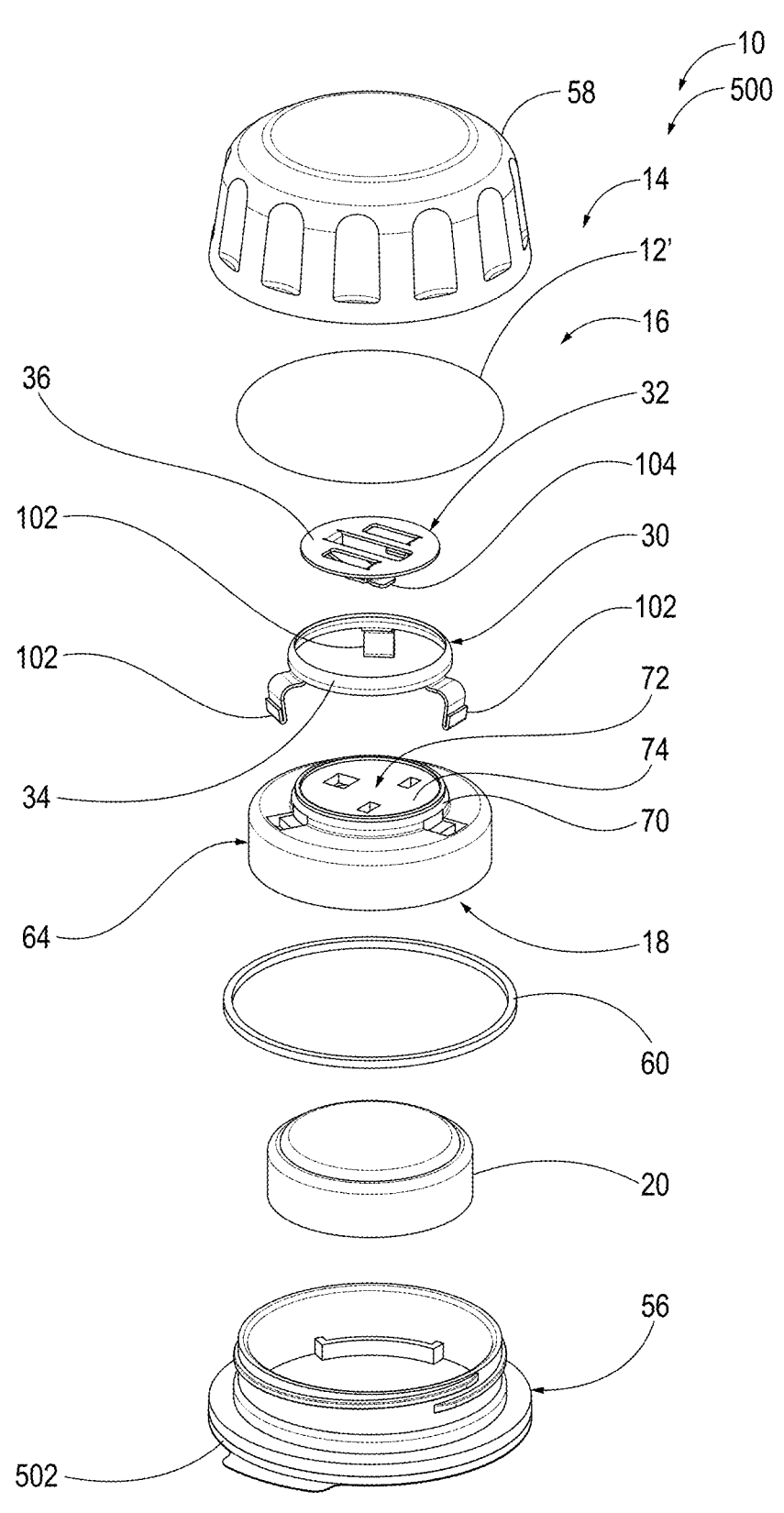
FIG. 15 is a further top isometric exploded view of the example housing of FIG. 13, shown with an Apple™ AirTag™ device and a housing battery.

FIGS. 13-15 illustrate exampling housing 500. Housing 500 is another example of a housing 10 that is configured to power an Apple™ AirTag™ device 12'; however, rather than utilizing two AA-batteries or two AAA-batteries, housing 500 is configured to utilize a single CR2477 coin battery that is larger than the standard CR2032 coin battery used with Apple™ AirTag™ devices. Housing 500 comprises a base 56, a cover 58 that is threadingly coupled to the base 56, and a base insert 64 that is removable, with the device-receiving region 16 and the housing battery region 18 of the housing 400 vertically stacked on opposite sides of the base insert 64. In particular, the base insert 64 substantially defines the battery region 18, within which the battery 20 is operatively received. The base 56 comprises a double-sided adhesive foam tape 502 for adhesively coupling the housing 500 to an article. Like housings 100, 300, and 400, the base insert 64 of housing 500 comprises a generally cylindrical projection 68, the first electrical contact 30 comprises a ring-shaped body 34, and the second electrical contact 32 comprises a disc-shaped body 36 seated within a recess 74 in the end wall 72 of the projection 68. Accordingly, like housings 100, 300, and 400, housing 500 is an example of a housing 10 that is configured to receive an Apple™ AirTag™ device 12' with its battery cover 46 removed, and with the Apple™ AirTag™ device 12' in any radial orientation about its central axis.

Figure 16:
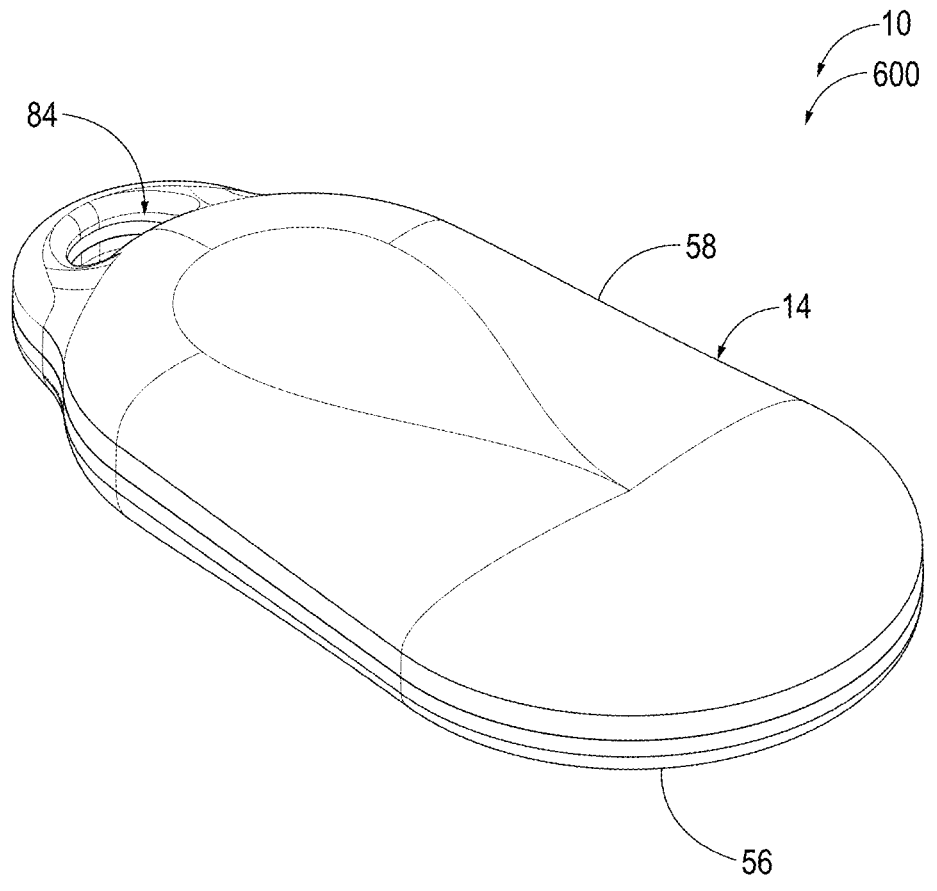
FIG. 16 is a top isometric view of another example housing according to the present disclosure.
Figure 17:
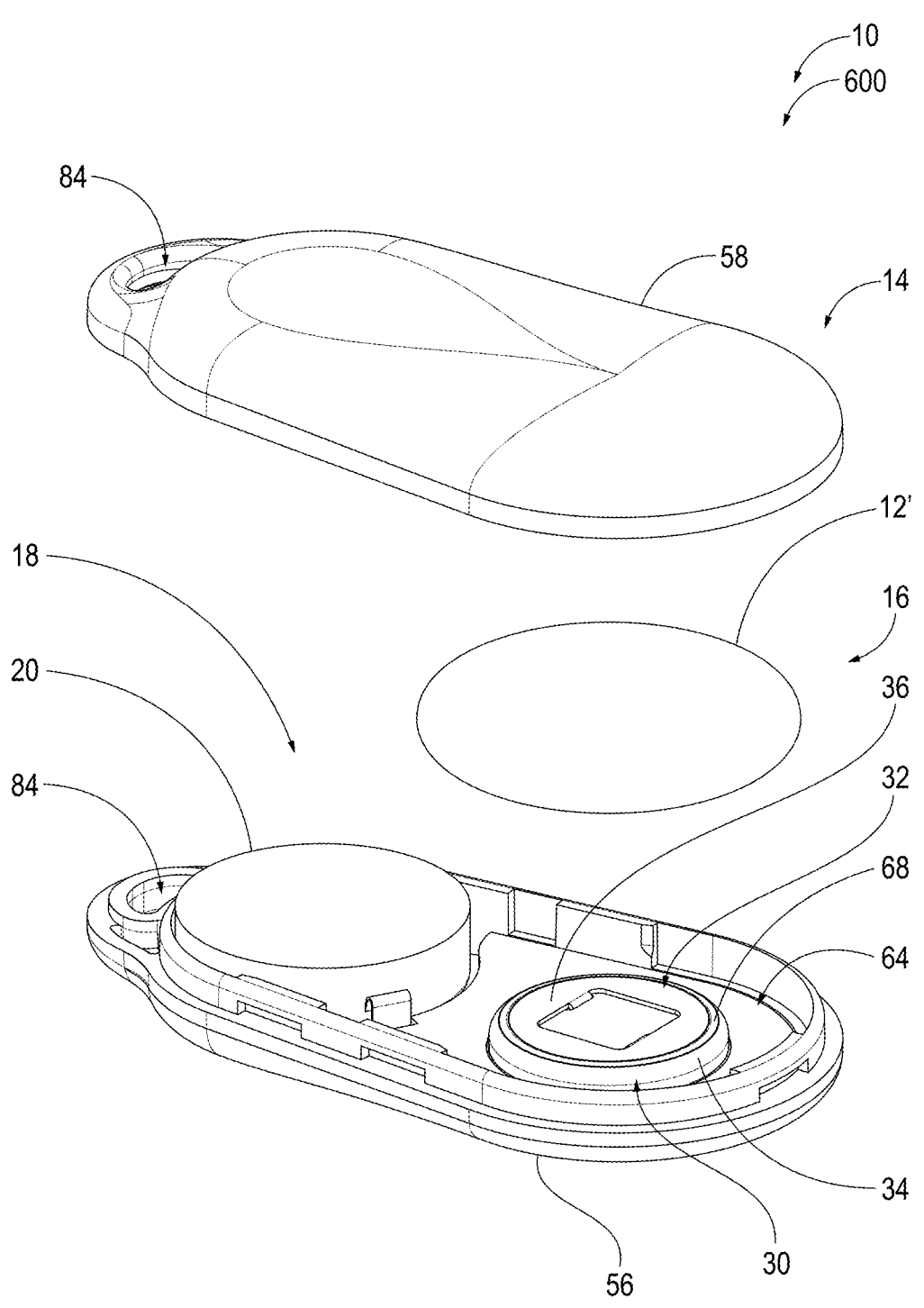
FIG. 17 is a top isometric exploded view of the example housing of FIG. 16, shown with an Apple™ AirTag™ device and with housing batteries installed.
Figure 18:
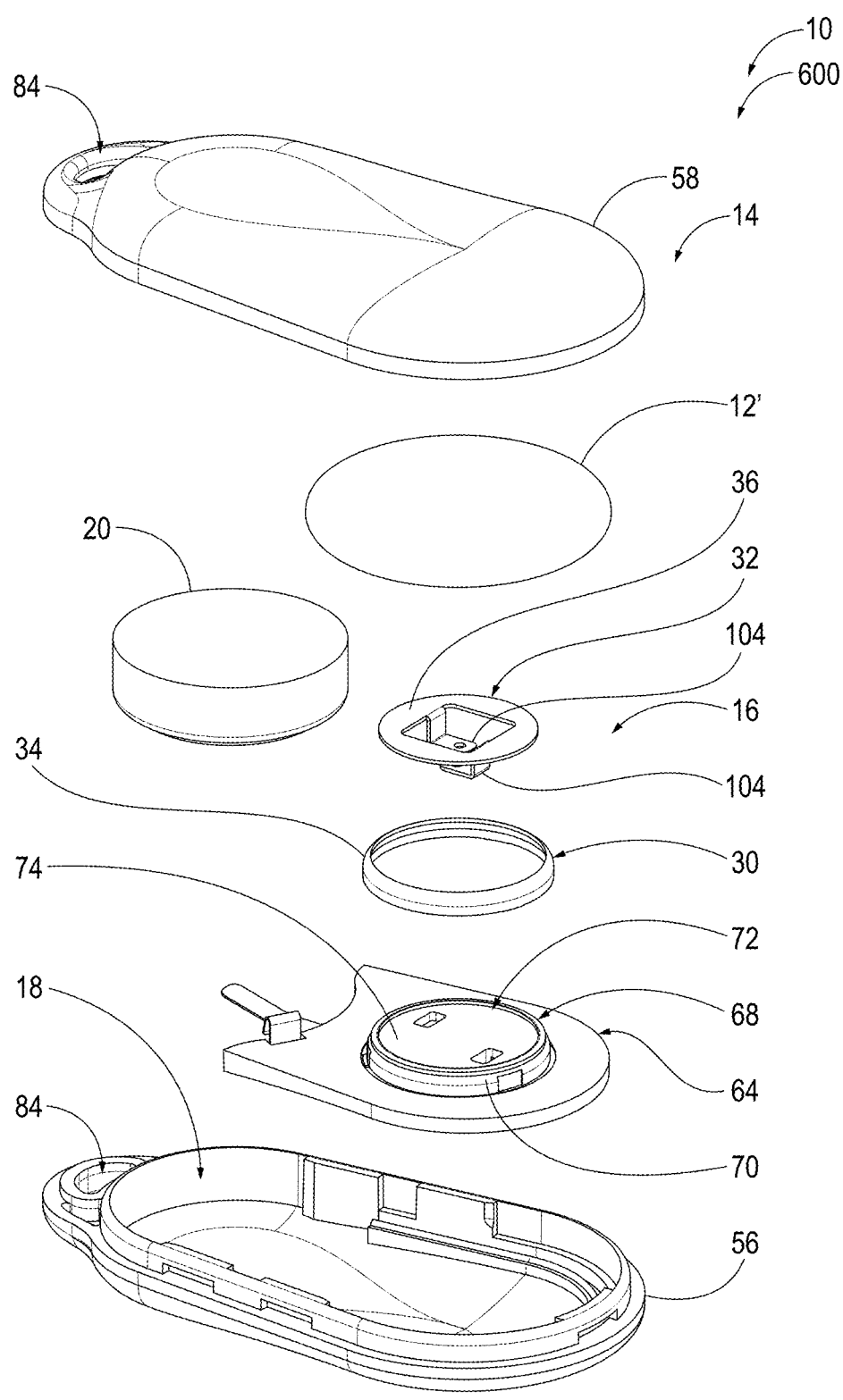
FIG. 18 is a further top isometric exploded view of the example housing of FIG. 16, shown with an Apple™ AirTag™ device and with housing batteries installed.

FIGS. 16-18 illustrate example housing 600. Housing 600 is another example of a housing 10 that is configured to power an Apple™ AirTag™ device 12' utilizing a single V-coin battery. Housing 600 comprises a base 56, a cover 58 that is removably coupled to the base 56 via a snap-fit arrangement, and a base insert 64. However, unlike housing 500, the device receiving region 16 and the housing battery region 19 of housing 600 are laterally positioned with respect to each other, rather than being vertically stacked. The base 56 and the cover 58 collectively define a through hole 84 configured to receive a keychain, carabiner, or other structure for operative attachment to of housing 600 to an article. Like housings 100, 300, 400, and 500 the base insert 64 of housing 600 comprises a generally cylindrical projec-tion 68, the first electrical contact 30 comprises a ring-shaped body 34, and the second electrical contact 32 comprises a disc-shaped body 36 seated within a recess 74 in the end wall 72 of the projection 68. Accordingly, like housings 100, 300, 400, and 500, housing 600 is an example of a housing 10 that is configured to receive an Apple™ AirTag™ device 12' with its battery cover 46 removed, and with the Apple™ AirTag™ device 12' in any radial orien-tation about its central axis.

Illustrative, non-exclusive examples of inventive subject matter according to the present disclosure are described in the following enumerated paragraphs:

A. A housing (10) for a tracking device (12), the housing (10) comprising:

a body (14), wherein the body (14) defines:

a device-receiving region (16) configured to selectively receive and retain the tracking device (12) in the body (14); and a housing battery region (18) configured to selectively receive and retain one or more housing batteries (20); and an electrical network (22) operatively positioned within the body (14) and configured to electrically couple the one or more housing batteries (20) with the tracking device (12) when the tracking device (12) is operatively received in the device-receiving region (16) and when the one or more housing batteries (20) are operatively received in the housing battery region (18).

A1. The housing (10) of paragraph A, wherein the tracking device (12) defines a tracking-device battery compartment (24) configured to operatively receive one or more device batteries (48);

wherein the tracking device (12) comprises:

a first tracking-device contact (26) positioned to opera-tively engage a first terminal (50) of the one or more device batteries (48) when the one or more device batteries (48) are operatively received in the track-ing-device battery compartment (24); and a second tracking-device contact (28) positioned to operatively engage a second terminal (52) of the one or more device batteries (48) when the one or more device batteries (48) are operatively received in the tracking-device battery compartment (24); and wherein the electrical network (22) comprises:

a first electrical contact (30) positioned to operatively engage the first tracking-device contact (26) when the tracking device (12) is operatively received in the device-receiving region (16); and a second electrical contact (32) positioned to opera-tively engage the second tracking-device contact (28) when the tracking device (12) is operatively received in the device-receiving region (16).

A1.1. The housing (10) of paragraph A1, wherein the one or more device batteries (48) comprise one or more coin batteries (54).

A1.2. The housing (10) of any of paragraphs A1-A1.1, wherein the first tracking-device contact (26) and the second tracking-device contact (28) are spring-biased toward the tracking-device battery compartment (24).

A1.3. The housing (10) of any of paragraphs A1-A1.2, wherein the tracking device (12) has a central axis (42); and wherein the housing (10) is configured to operatively receive the tracking device (12) in any radial orienta-tion of the tracking device (12) about the central axis (42), and have the first electrical contact (30) opera-tively engage the first tracking-device contact (26) and the second electrical contact (32) operatively engage the second tracking-device contact (28) when the track-ing device (12) is operatively received in the device-receiving region (16).

A1.4. The housing (10) of any of paragraphs A1-A1.3, wherein the second electrical contact (32) comprises a disc-shaped body (36).

A1.5. The housing (10) of any of paragraphs A1-A1.4, wherein the first electrical contact (30) comprises a ring-shaped body (34).

A1.5.1. The housing (10) of paragraph A1.5 when depending from paragraph A1.4, wherein the ring-shaped body (34) and the disc-shaped body (36) are coaxial.

A1.5.1.1. The housing (10) of paragraph A1.5.1 when depending from paragraph A1.3, wherein the ring-shaped body (34), the disc-shaped body (36), and the central axis (42) of the tracking device (12) are coaxial when the tracking device (12) is operatively received in the device-receiving region (16).

A1.6. The housing (10) of any of paragraphs A1-A1.2, wherein the tracking device (12) comprises one or more structural features (38) that at least partially define the tracking-device battery compartment (24) or that extend into the tracking-device battery compartment (24); and wherein the housing (10) further comprises one or more indexing features (40) configured to engage the one or more structural features (38) for alignment and engage-ment of the first electrical contact (30) with the first tracking-device contact (26) and for alignment and engagement of the second electrical contact (32) with the second tracking-device contact (28) when the tracking device (12) is operatively received in the device-receiving region (16).

A1.6.1. The housing (10) of paragraph A1.6, wherein the one or more structural features (38) are configured to selectively mate with a battery cover (46) that is configured to selectively retain the one or more device batteries (48) within the tracking-device battery compartment (24).

A2. The housing (10) of any of paragraphs A-A1.6.1, wherein the body (14) comprises:

a base (56); and one or more covers (58) operatively coupled to the base (56) to permit placement and removal of the tracking device (12) in and from the device-receiving region (16) and to permit placement and removal of the one or more housing batteries (20) in and from the housing battery region (18).

A2.1. The housing (10) of paragraph A2, further comprising:

one or more gaskets (60) operatively positioned to provide a seal or seals between the base (56) and the one or more covers (58) when the one or more covers (58) are operatively coupled to the base (56).

A2.2. The housing (10) of any of paragraphs A2-A2.1, wherein the base (56) comprises:

a main base (62); and a base insert (64) operatively positioned within the body (14).

A2.2.1. The housing (10) of paragraph A2.2, wherein the base insert (64) is coupled to the main base (62).

A2.2.2. The housing (10) of any of paragraphs A2.2-A2.2.1, wherein the base insert (64) at least partially defines the device-receiving region (16).

A2.2.3. The housing (10) of any of paragraphs A2.2-A2.2.2, wherein the base insert (64) at least partially defines the housing battery region (18).

A2.2.4. The housing (10) of any of paragraphs A2.2-A2.2.3, wherein the electrical network (22) comprises wires (66); and wherein the base insert (64) at least partially conceals the wires (66) between the base insert (64) and the main base (62).

A2.2.5. The housing (10) of any of paragraphs A2.2-A2.2.4, wherein the base insert (64) is electrically non-conductive.

A2.2.6. The housing (10) of any of paragraphs A2.2-A2.2.5, wherein at least a portion of the electrical network (22) extends through the base insert (64).

A2.3. The housing (10) of any of paragraphs A2-A2.2.6, wherein the tracking device (12) defines a/the tracking-device battery compartment (24) configured to operatively receive (the) one or more device batteries (48); and wherein the base (56) comprises a projection (68) positioned to operatively extend into the tracking-device battery compartment (24) when the tracking device (12) is operatively received in the device-receiving region (16).

A2.3.1. The housing (10) of paragraph A2.3 when depending from paragraph A2.2, wherein the base insert (64) comprises the projection (68).

A2.3.2. The housing (10) of any of paragraphs A2.3-A2.3.1, wherein the projection (68) is generally cylindrical.

A2.3.3. The housing (10) of any of paragraphs A2.3-A2.3.2 when depending from paragraph A1, wherein the projection (68) at least partially supports the first electrical contact (30) and the second electrical contact (32).

A2.3.4. The housing (10) of any of paragraphs A2.3-A2.3.3., wherein the projection (68) is electrically non-conductive.

A2.3.5. The housing (10) of any of paragraphs A2.3-A2.3.4, wherein the projection (68) comprises a perimeter wall (70) and an end wall (72), wherein the first electrical contact (30) is at least partially supported by the perimeter wall (70), and wherein the second electrical contact (32) is at least partially supported by the end wall (72).

A2.3.5.1. The housing (10) of paragraph A2.3.5, wherein the end wall (72) defines a recess (74), and wherein the second electrical contact (32) is positioned at least partially within the recess (74).

A2.3.5.1.1. The housing (10) of paragraph A2.3.5.1 when depending from paragraph A2.3.2, wherein the recess (74) is circular.

A2.3.5.2. The housing (10) of any of paragraphs A2.3.5-A2.3.5.1.1, wherein at least a portion of the electrical network (22) extends through the end wall (72).

A3. The housing (10) of any of paragraphs A-A2.3.5.2, wherein the tracking device (12) comprises:

a/the first tracking-device contact (26) positioned to operatively engage a/the first terminal (50) of (the) one or more device batteries (48) when the one or more device batteries (48) are operatively received in a/the tracking-device battery compartment (24), wherein the first tracking-device contact (26) is spring-biased; and a/the second tracking-device contact (28) positioned to operatively engage a/the second terminal (52) of the one or more device batteries (48) when the one or more device batteries (48) are operatively received in the tracking-device battery compartment (24), wherein the second tracking-device contact (28) is spring-biased; and wherein the device-receiving region (16) is configured to compress the first tracking-device contact (26) and the second tracking-device contact (28) when the tracking device (12) is operatively received in the device-receiving region (16).

A4. The housing (10) of any of paragraphs A-A3, wherein the body (14) comprises one or more ribs (76) operatively positioned to engage the tracking device (12) when the tracking device (12) is operatively received in the device-receiving region (16).

A4.1. The housing (10) of paragraph A4 when depending from paragraph A2, wherein the one or more covers (58) comprise the one or more ribs (76).

A4.2. The housing (10) of any of paragraphs A4-A4.1 when depending from paragraph A1.2, wherein the one or more ribs (76) are configured to operatively compress the first tracking-device contact (26) and/or the second tracking-device contact (28) when the one or more ribs (76) operatively engage the tracking device (12) when the tracking device (12) is operatively received in the device-receiving region (16).

A4.3. The housing (10) of any of paragraphs A4-A4.2, wherein the one or more ribs (76) comprise a circular rib (78).

A4.3.1. The housing (10) of paragraph A4.3 when depending from paragraph A1.5.1, wherein the circular rib (78) is coaxial with the ring-shaped body (34) and the disc-shaped body (36).

A4.3.2. The housing (10) of any of paragraphs A4.3-A4.3.1 when depending from paragraph A2.3, wherein the circular rib (78) is coaxial with the projection (68).

A5. The housing (10) of any of paragraphs A-A4.3.2, further comprising:

a coupler (80) configured to operatively attach the housing (10) to an article (82).

A6. The housing (10) of any of paragraphs A-A5, wherein the device-receiving region (16) is configured to selectively receive and retain the tracking device (12) in the body (14) without a/the battery cover (46) of the tracking device (12) present.

A7 The housing (10) of any of paragraphs A-A6, wherein the housing (10) defines a through hole (84).

A8. The housing (10) of any of paragraphs A-A7, wherein the tracking device (12) has a/the central axis (42); and wherein the housing (10) is configured such that when the tracking device (12) is operatively received in the device-receiving region (16), the device-receiving region (16) and the housing battery region (18) are aligned with the central axis (42).

A9. The housing (10) of any of paragraphs A-A7.

wherein the tracking device (12) has a/the central axis (42); and wherein the device-receiving region (16) is positioned lateral to the housing battery region (18) relative to the central axis (42) when the tracking device (12) is operatively received in the device-receiving region (16).

A10. The housing (10) of any of paragraphs A-A9, wherein the one or more housing batteries (20) comprise one or more cylindrical batteries.

A11. The housing (10) of any of paragraphs A-A9, wherein the one or more housing batteries (20) comprise one or more coin batteries.

A12. The housing (10) of any of paragraphs A-A11, further comprising the one or more housing batteries (20).

A13. The housing (10) of any of paragraphs A-A12, further comprising the tracking device (12).

A13.1. The housing (10) of paragraph A13, wherein the tracking device (12) is operatively received in the device-receiving region (16).

A14. The housing (10) of any of paragraphs A-A13.1, wherein the tracking device (12) comprises an Apple™ AirTag™ device (12').

B. A housing (10) for a tracking device (12), the housing (10) comprising:

a body (14), wherein the body (14) defines:

a device-receiving region (16) configured to selectively receive and retain the tracking device (12) in the body (14); and a housing battery region (18) configured to selectively receive and retain one or more housing batteries (20); and means for electrically connecting the tracking device (12) to the one or more housing batteries (20).

B1. The housing (10) of paragraph B, wherein the means for electrically connecting comprises the subject matter of any of paragraphs A-A14.

C. A method of powering a tracking device (12), the method comprising:

with a battery cover (46) of the tracking device (12) removed and with no device batteries (48) within a tracking-device battery compartment (24) of the tracking device (12):

operatively engaging a first electrical contact (30) of a housing (10) with a first tracking-device contact (26) within the tracking-device battery compartment (24) of the tracking device (12); and operatively engaging a second electrical contact (32) of the housing (10) with a second tracking-device contact (28) within the tracking-device battery compartment (24) of the tracking device (12).

C1. The method of paragraph C, wherein the housing (10) comprises the housing (10) of any of paragraphs A-B1.

D. Use of the housing (10) of any of paragraphs A-B1 to power the tracking device (12).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A housing (10) for a tracking device (12), the housing (10) comprising:

a body (14), wherein the body (14) defines:

a device-receiving region (16) configured to selectively receive and retain the tracking device (12) in the body (14) with no device batteries (48) within a tracking-device battery compartment (24) of the tracking device (12) and without a battery cover (46) of the tracking device (12) present; and a housing battery region (18) configured to selectively receive and retain one or more housing batteries (20); and an electrical network (22) operatively positioned within the body (14) and configured to electrically couple the one or more housing batteries (20) with the tracking device (12) when the tracking device (12) is operatively received in the device-receiving region (16) and when the one or more housing batteries (20) are operatively received in the housing battery region (18).

2. The housing (10) of claim 1, wherein the housing (10) is configured to operatively receive the tracking device (12) in any radial orientation of the tracking device (12) about a central axis (42) of the tracking device (12).

3. The housing (10) of claim 1, wherein the electrical network (22) comprises:

a first electrical contact (30) comprising a ring-shaped body (34) positioned to operatively engage a first tracking-device contact (26) of the tracking device (12) when the tracking device (12) is operatively received in the device-receiving region (16); and a second electrical contact (32) comprising a disc-shaped body (36) positioned to operatively engage a second tracking-device contact (28) of the tracking device (12) when the tracking device (12) is operatively received in the device-receiving region (16).

4. The housing (10) of claim 3, wherein the ring-shaped body (34) and the disc-shaped body (36) are coaxial.

5. The housing (10) of claim 1, wherein the body (14) comprises:

a base (56); and one or more covers (58) operatively coupled to the base (56) to permit placement and removal of the tracking device (12) in and from the device-receiving region (16) and to permit placement and removal of the one or more housing batteries (20) in and from the housing battery region (18).

6. The housing (10) of claim 5, wherein the base (56) comprises:

a main base (62); and a base insert (64) operatively positioned within the body (14).

7. The housing (10) of claim 6, wherein the base insert (64) is coupled to the main base (62).

8. The housing (10) of claim 6, wherein the base insert (64) is removable from the main base (62).

9. The housing (10) of claim 6, wherein the base insert (64) at least partially defines the device-receiving region (16).

10. The housing (10) of claim 6, wherein the base insert (64) at least partially defines the housing battery region (18).

11. The housing (10) of claim 6, wherein the base insert (64) is electrically non-conductive.

12. The housing (10) of claim 6, wherein at least a portion of the electrical network (22) extends through the base insert (64).

13. The housing (10) of claim 5, wherein the base (56) comprises a projection (68) positioned to operatively extend into a tracking-device battery compartment (24) of the tracking device (12) when the tracking device (12) is operatively received in the device-receiving region (16).

14. The housing (10) of claim 1, wherein the device-receiving region (16) is configured to compress a first tracking-device contact (26) and a second tracking-device contact (28) of the tracking device (12) when the tracking device (12) is operatively received in the device-receiving region (16).

15. The housing (10) of claim 1, further comprising:

a coupler (80) configured to operatively attach the housing (10) to an article (82).

16. The housing (10) of claim 1, wherein the housing (10) defines a through hole (84).

17. The housing (10) of claim 1, wherein the housing (10) is configured such that when the tracking device (12) is operatively received in the device-receiving region (16), the device-receiving region (16) and the housing battery region (18) are aligned with a central axis (42) of the tracking device (12).

18. The housing (10) of claim 1, wherein the device-receiving region (16) is positioned lateral to the housing battery region (18) relative to a central axis (42) of the tracking device (12) when the tracking device (12) is operatively received in the device-receiving region (16).

19. A housing (10) for a tracking device (12), the housing (10) comprising:

a body (14), wherein the body (14) defines:

a device-receiving region (16) configured to selectively receive and retain the tracking device (12) in the body (14) with no device batteries (48) within a tracking-device battery compartment (24) of the tracking device (12) and without a battery cover (46) of the tracking device (12) present; and a housing battery region (18) configured to selectively receive and retain one or more housing batteries (20); and means for electrically connecting the tracking device (12) to the one or more housing batteries (20).

20. A method of powering a tracking device (12), the method comprising:

with a battery cover (46) of the tracking device (12) removed and with no device batteries (48) within a tracking-device battery compartment (24) of the tracking device (12):

operatively engaging a first electrical contact (30) of a housing (10) with a first tracking-device contact (26) within the tracking-device battery compartment (24) of the tracking device (12); and operatively engaging a second electrical contact (32) of the housing (10) with a second tracking-device contact (28) within the tracking-device battery compartment (24) of the tracking device (12).

21. A housing (10) for a tracking device (12), the housing (10) comprising:

a body (14), wherein the body (14) defines:

a device-receiving region (16) configured to selectively receive and retain the tracking device (12) in the body (14) without a battery cover (46) of the tracking device (12) present; and a housing battery region (18);

one or more housing batteries (20) positioned within the housing battery region (18) to be coaxial with and electrically coupled with the tracking device (12) when the tracking device (12) is operatively received in the device-receiving region (16).

\* \* \* \* \*